US009256467B1

(12) United States Patent
Singh et al.

(10) Patent No.: US 9,256,467 B1
(45) Date of Patent: Feb. 9, 2016

(54) SYSTEM FOR MANAGING AND SCHEDULING CONTAINERS

(71) Applicant: Amazon Technologies, Inc., Seattle, WA (US)

(72) Inventors: Deepak Singh, Issaquah, WA (US); Anthony Joseph Suarez, Seattle, WA (US); William Andrew Thurston, Seattle, WA (US); Anirudh Balachandra Aithal, Seattle, WA (US); Daniel Robert Gerdesmeier, Seattle, WA (US); Euan Skyler Kemp, Seattle, WA (US); Kiran Kumar Meduri, Bellevue, WA (US); Muhammad Umer Azad, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/538,663

(22) Filed: Nov. 11, 2014

(51) Int. Cl.
G06F 9/46 (2006.01)
G06F 9/50 (2006.01)
G06F 9/455 (2006.01)

(52) U.S. Cl.
CPC .......... *G06F 9/5005* (2013.01); *G06F 9/45533* (2013.01)

(58) Field of Classification Search
CPC .................................................... G06F 9/5005
USPC .................................................. 718/101–108
See application file for complete search history.

(56) References Cited

U.S. PATENT DOCUMENTS

| 7,805,706 | B1* | 9/2010 | Ly | G06F 9/5083 709/221 |
| 8,788,855 | B2* | 7/2014 | Cong | G06F 1/3206 713/320 |
| 2004/0040025 | A1* | 2/2004 | Lehtinen | G06F 9/4881 718/104 |
| 2006/0136928 | A1* | 6/2006 | Crawford | G06F 9/5077 718/105 |
| 2007/0118657 | A1* | 5/2007 | Kreitzer | G06F 17/30038 709/227 |

OTHER PUBLICATIONS

Zhao, M., & Figueiredo, R. J. (Nov. 2007). Experimental study of virtual machine migration in support of reservation of cluster resources. In Proceedings of the 2nd international workshop on Virtualization technology in distributed computing, pp. 1-8, ACM.*

(Continued)

*Primary Examiner* — Satish Rampuria
(74) *Attorney, Agent, or Firm* — Davis Wright Tremaine LLP

(57) ABSTRACT

A system and method for a container service that obtains a software image of a software container that has been configured to be executed within a computer system instance registered to a cluster by one or more processors. The container service is configured to receive a request to launch the software image in accordance with a task definition, wherein the task definition specifies an allocation of resources for the software container. The container service may then determine, according to a placement scheme, a subset of a set of container instances registered to the cluster in which to launch the software image in accordance with the task definition. Upon determining the subset of the set of container instances, the container service may launch the software image as one or more running software containers in the set of container instances in accordance with the task definition.

19 Claims, 16 Drawing Sheets

(56) References Cited

OTHER PUBLICATIONS

Soltesz, S., Pötzl, H., Fiuczynski, M. E., Bavier, A., & Peterson, L. (Mar. 2007). Container-based operating system virtualization: a scalable, high-performance alternative to hypervisors. In ACM SIGOPS Operating Systems Review (vol. 41, No. 3, pp. 275-287). ACM.*

Xavier, M. G., Neves, M. V., Rossi, F. D., Ferreto, T. C., Lange, T., & De Rose, C. A. (Feb. 2013). Performance evaluation of container-based virtualization for high performance computing environments. In Parallel, Distributed and Network-Based Processing (PDP), 2013 21st Euromicro International Conference on (pp. 233-240). IEEE.*

* cited by examiner

SYSTEM FOR MANAGING AND SCHEDULING CONTAINERS

BACKGROUND

Companies and individuals seeking to reduce the expense and overhead associated with maintaining their own computing resources have turned instead to purchasing remote computing services, such as remote program execution over multiple virtual machine instances and remote data storage, offered by computing resource service providers to customers. Such remote computing services are often configurable and scalable to meet various computing needs of the customers of the computing resource service provider. However, it can be difficult for a customer to manage various applications running on multiple virtual machine instances and such applications may not be portable to other computing systems or scalable to meet an increased need for resources.

BRIEF DESCRIPTION OF THE DRAWINGS

Various embodiments in accordance with the present disclosure will be described with reference to the drawings, in which.

DETAILED DESCRIPTION

Figure 1:
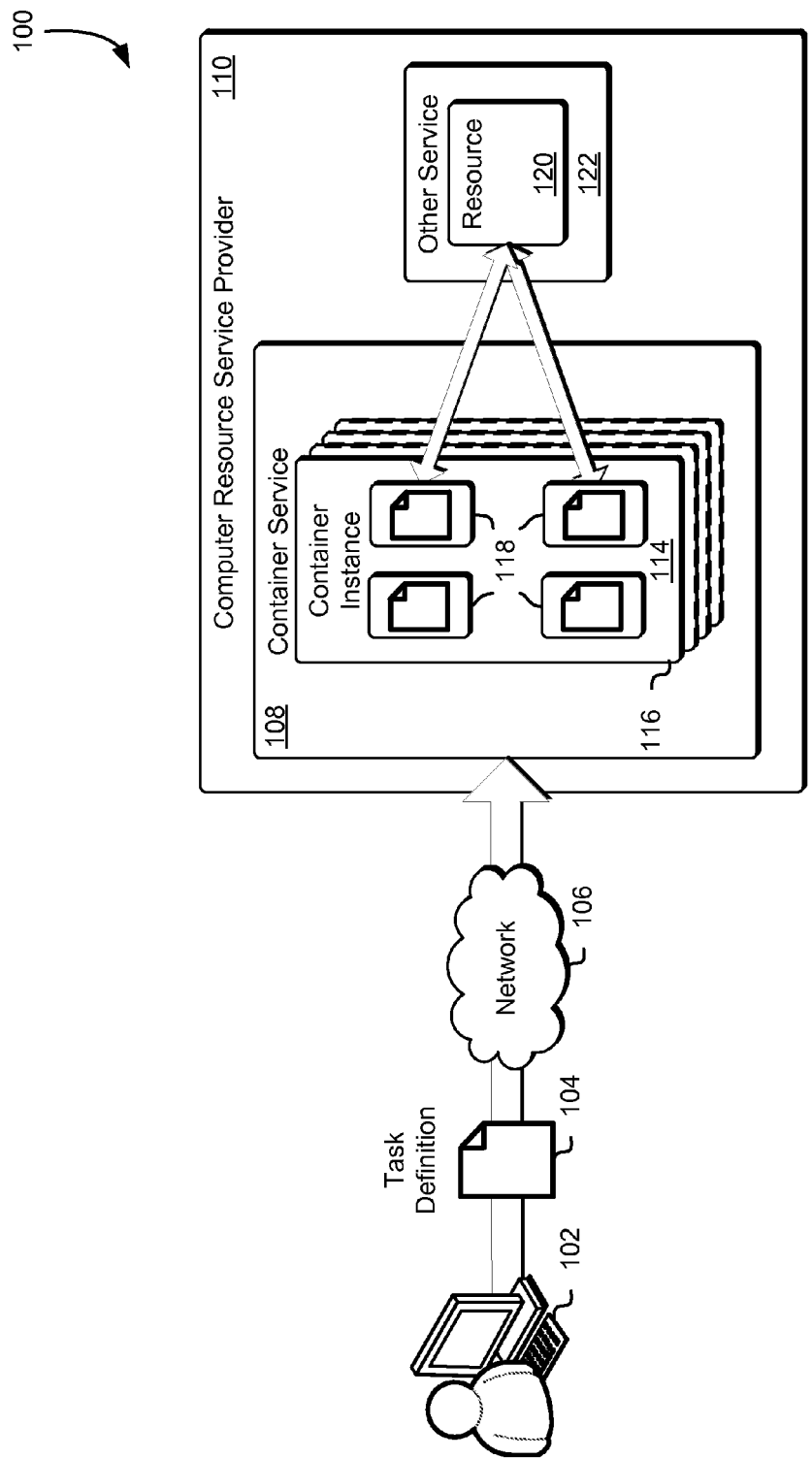
FIG. 1 illustrates an example of customer interacting with a container service in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems and methods for creating clusters of software container instances for running software containers for customers of a computing resource service provider. The software container instances may be virtual machine instances configured to support containerization, and the software container instances may be registered or deregistered from the cluster as needed to fit the needs of the customer. Each software container instance may contain a container agent, which is an application configured to, when executed by one or more processors of a computer system, perform various tasks with software containers and the software container instances, including registering container instances, deregistering container instances, starting tasks, stopping tasks, providing task statuses, signaling task heartbeats, and reporting task events. Software containers may include data and one or more processes that, when executed in a computer system instance configured to support containerization, may be isolated from other processes running within the same computer system instance.

The software containers may be configured to run as tasks according to a task definition, and the task definition may be stored as a task definition file. The task definition file may describe one or more software containers that are assigned to start as a group. Software images of the software containers, which may represent an entire copy of the particular state of the software container at the time the software image was generated, that have been configured to execute within the software container instances, may be provided to the computing resource service provider, or their locations specified in the task definition. The task definition may also specify resource requirements, relationships between containers, network ports used, and shared resources.

Upon receiving a request to start the tasks of the task definition, a scheduler may determine, according to a placement scheme, which software container instances within the cluster to run the tasks. In some cases, the computing resource service provider may provide a multitenant scheduler for determining where to run software containers, and in some cases, the computing resource service provider may allow customers to provide and configure their own schedulers to customize how the scheduler operates. In some cases, the scheduler may be configured use a random selection scheme to randomly (according to some stochastic distribution scheme) or in a round robin fashion select a container instance to host a given software container, taking into account the resource requirements specified in the task definition. The container agents may be configured to start the tasks within their respective software container instances. In some embodiments, a telemetry agent may be configured to collect data, such as control group metrics and log event information about the running software containers, and report that data to a telemetry service. The telemetry service may allow the customers to monitor the states of software containers within their container instances, and customers may specify, via the telemetry service, actions to perform in response to various container events and criteria for raising alerts based on the collected data.

The described and suggested techniques improve the field of computing, and specifically the fields of virtualization and containerization, by providing a set of multitenant containerization services for managing software containers. Additionally, the described and suggested techniques improve the functioning of computer systems by allowing resources of computing systems to be efficiently allocated and isolating software applications such that they do not compete with resources between each other. Moreover, the described and suggested techniques offer meaningful advantages over general virtualization systems by improving portability, providing multitenant services, and auto-scaling resources as demand increases or decreases.

FIG. 1 illustrates an aspect of an environment 100 in which an embodiment may be practiced. As illustrated in FIG. 1, the environment 100 may include a customer 102 that sends a task definition file 104 for software containers 118 along with a request to launch tasks through a network 106 to a container service 108 of a computing resource service provider 110. A scheduler, such as the scheduler 208 of FIG. 2, may determine into which container instance 114 of a cluster 116 of container instances that the software containers 118 specified in the task definition file 104 should be launched. In some embodiments, the software containers may be configured to share resources 120 provided by other services 122 of the computing resource service provider 110, such as a storage volume provided by a block-level data storage service of the computing resource service provider 110.

The customer 102 may be an individual associated with a customer account of the container service, or may be an individual, system, resource computing device, or other entity authorized to act on behalf of the individual associated with the customer account. Furthermore, the resources of the customer 102 may be made available to other users. For example, the customer 102 may utilize the container instance 114 to provide an online marketplace for other users, and these other users may then buy and/or sell goods and services through the online marketplace provided by the customer 102 through the container service. The customer 102 may communicate with the container service 108 of the computing resource service provider 110 through the network 106, which may be a communication network, such as the Internet, an intranet, an internet service provider (ISP) network and/or some other such network as described below.

In some examples, a "task definition" or "task definition file" may refer to file specifying a set of linked containers (i.e., a set of containers that, when running on a host computing system, are associated with each other) that are assigned to start as a group. The task definition file 104 may further specify disk and network locations that the containers 118 are able to share on a single physical machine. The task definition file 104 may then be utilized for launching the set of containers 118. In some implementations, the task definition file 104 may define and link containers 118 spread across multiple physical machines. One task definition file 104 may contain and schedule many tasks. In some examples, a "task" may refer to an instantiation of a task definition file 104, and may consist of one or more containers 118. Tasks may be modified by applying a new task definition to the task.

The task definition file 104 may contain all the information needed to place containers 118 in a cluster 116, and the cluster 116 may be managed through application programming interface calls.

An example of a task definition may be:

```
{ 'db':
    {
        'Image' : 'forest/postgresql',
        'Ports' : ['5432'],
        'CPU' : 1000,
        'Memory' : 1073741824
    },
    'web' :
```

-continued

```
    {
        'Image' : 'hub.web.com/rails:latest',
        'Ports' : ['8000:8000'],
        'links' : ['db'],
        'CPU' : 1000,
        'Memory' : 1073741824
    }
}
```

The example task definition specifies that a first task, entitled "db," has a software image located at the path "forest/postgresql." The first task is allocated processing shares of 1,000 and 1 gigabyte of memory, and the first task uses port 5432. Similarly, the task definition also specifies that a second task, entitled "web," has a software image located at the path "hub.web.com/rails:latest." The second task is allocated processing shares of 1,000 and 1 gigabyte of memory, and the second task uses ports 8000:8000. The task definition notes that the second task ("web") is allowed to link to the first task ("db"). Note that while some units used in this example are given as a fixed number, such as the processing capacity given as a fixed number of central processing unit shares, it is contemplated that other units and other types of values (e.g., percentages of total processing capacity, percentages of total memory) could be used instead to allow for dynamic resource allocation.

The container service 108 may be a service provided by the computing resource service provider 110 to allow the customer 102 to execute the containers 118 within the cluster 116. The container service 108 may be similar to the container service 200 described in conjunction with FIG. 2. The computing resource service provider 110 may be a computing resource service provider similar to the computing resource service provider 1502 described in conjunction with FIG. 15, and may provide one or more computing resource services to its customers individually or as a combination of services of a distributed computer system. The one or more computing resource services of the computing resource service provider 110 may be accessible over the network 106 and may include services such as virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

As one example, the computing resource service provider 110 may be an entity that provides computing resources, such as data storage services, virtual computer system services, and/or web services. Customers of the computing resource service provider 110 may communicate with one or more of the services via an interface, which may be a web services interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running an operating system) that is configured to launch and run software containers. Thus, the container instance 114 may be configured to run the containers 118 in accordance with the task definition file 104 provided by the customer 102. One or more container instances may comprise a cluster. In some examples, "cluster" may refer to set of one or more container instances that have been registered to (i.e., as being associated with) the cluster. Thus, the container instance 114 may be one of many different container instances registered to the cluster 116, and the other container instances of the cluster 116 may be configured to run the same or different types of containers as the containers 118. The container instances within the cluster may be of different instance types or of the same instance type, and the customer 102 may have more than one cluster. Thus, the customer 102 may launch one or more clusters and then manage user and application isolation of the containers 118 within each cluster through application programming interface calls. Further detail about clusters may be found in the description of FIG. 2.

A container (also referred to as a software container or isolated user space instance) may be a lightweight virtualization instance running under a computer system instance that includes programs, data, and system libraries. When the container is run, the running program (i.e., the process) is isolated from other processes running in the same computer system instance. Thus, the containers 118 may each run on an operating system (e.g., using memory, CPU, and storage allocated by the operating system) an operating system of the container instance 114 and execute in isolation from each other (e.g., each container may have in isolated view of the file system of the operating system). Each of the containers 118 may have its own namespace, and applications running within the containers 118 are isolated by only having access to resources available within the container namespace. Thus, containers 118 may be an effective way to run one or more single applications within their own namespace. A container encapsulation system allows one or more containers to run within a single operating instance without overhead associated with starting and maintaining virtual machines for running separate user space instances. An example container encapsulation system is the Docker container engine.

The containers 118 may be launched to have only specified resources from resources allocated to the container instance 114; that is, a container may be launched to have a certain amount of memory and to not utilize more than a specified amount of processing power. The resource allocation for the containers 118 may be specified in the task definition file 104. Multiple containers may run simultaneously on a single host computer or host container instance, and the resources of the host can be allocated efficiently between the containers. In some embodiments, a host may support running containers in container instances from only one customer. In other embodiments, a single host may allow multiple customers to have container instances running on the host. In the latter case, the container service may provide security to ensure that the customers are unable to access containers, clusters, or container instances of the others.

Different types of tasks may have different resource requirements and may have different lifespans. Thus, the containers 118 may be dynamically scheduled to run by a scheduler service in the container service 110 independent of an underlying operating system of the container instance, and as such, the underlying operating system of the container instance 114 may be very basic. Alternatively, the containers 118 may be scheduled to run by a scheduler installed within the container instance 114 of the cluster 116.

Figure 15:
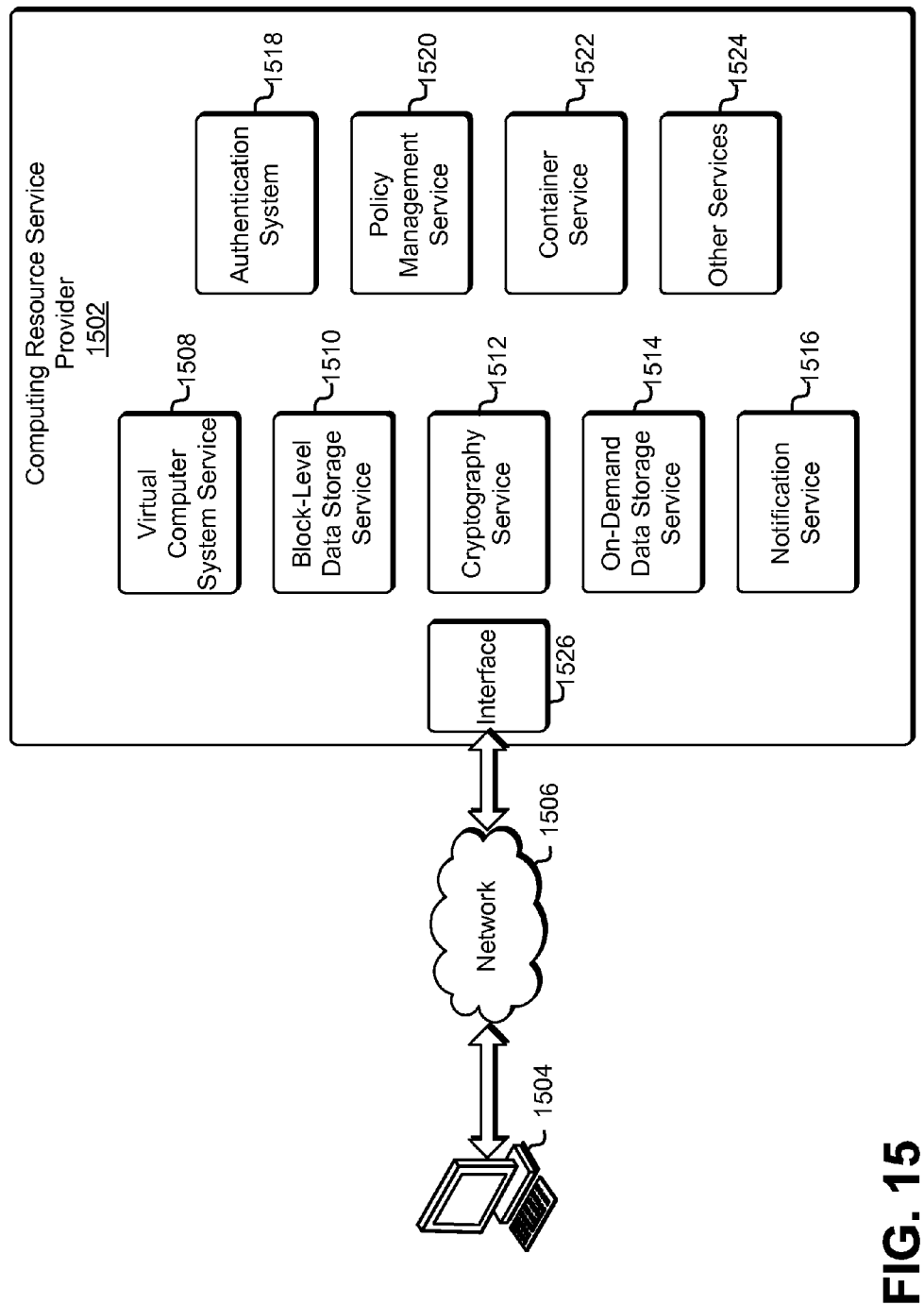
FIG. 15 illustrates an example service design of a system for managing and scheduling containers in accordance with an embodiment.

The other services 122 may be services such as services 1508-20 and 1524 of the computing resource service provider 1502 described in conjunction with FIG. 15. Likewise, the other resources 120 may include resources that can be shared between virtualized instances, such as a storage volume of a block-level data storage service.

Figure 2:
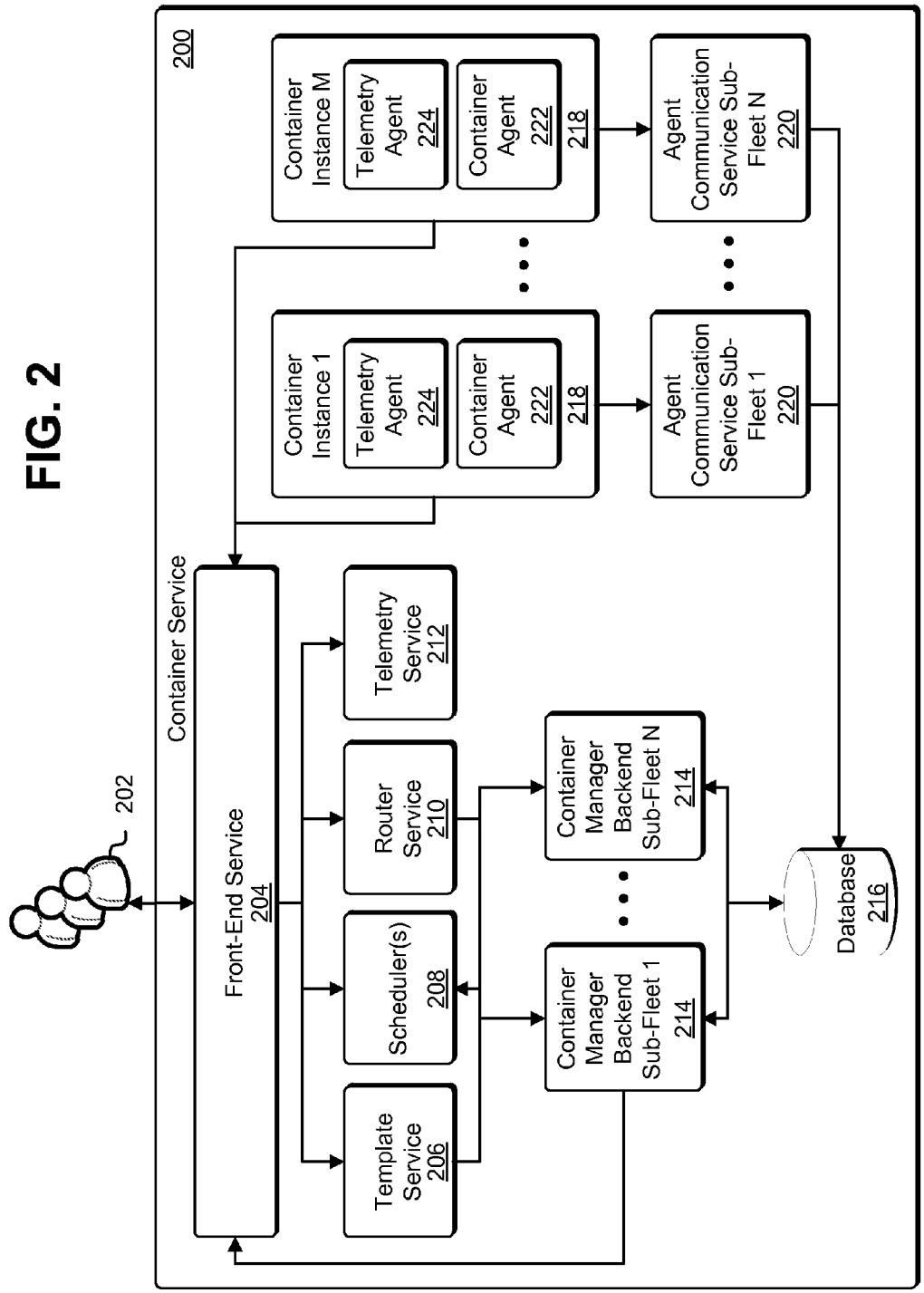
FIG. 2 illustrates an example of a container service in accordance with an embodiment.

FIG. 2 illustrates an example container service 200 of an embodiment of the present disclosure. As illustrated in FIG. 2, the environment 200 may include customers 202 of a computing resource service provider communicating through a front-end service 204 manage one or more containers within one or more container instances 218. As noted, a container encapsulation system provided by or interfaced to the container service 200 may allow a customer to configure one or more applications within a container of an operating system which supports containers. The running processes and resources within the container may be isolated from other processes of the parent container instance and from the running processes and resources within other containers of the same host system. The customer may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines and each container may be expected to run in exactly the same way as the base container.

Each of the container instances 218 may be configured to contain a pair of agents, the container agent 222 and a telemetry agent 224, that may allow containers to be managed, may provide cluster state information, and may enable logging and telemetry data collection. The container service 200 may be comprised of a set of services, including a template service 206, one or more schedulers 208, a router service 210, and a telemetry service 212. Because the container service 200 may be configured as a multitenant service (i.e., the resources of the container service 200 may serve multiple customers concurrently), and because the services provided by the container service 200 exist outside and separate from the container instances 218, the customers 202 need not install individual software applications within their respective container instances 218 to provide the functionality afforded by the services. The customers 202 may utilize the functionality provided by these services by making web service application programming interface function calls through the front-end service 204, which may be configured to receive requests from the customers 202 and forward the requests to the appropriate service, such as the appropriate container manager backend service 214.

As noted, a customer may launch one or more clusters and then manage user and application isolation within each cluster through the front-end service 204. For example, the customer may specify that "instances 1-10" should comprise a first cluster and "instances 11-15" should comprise a second cluster. Thereafter, when the customer submits a launch request for a container, the customer may specify whether the container should be launched in the first cluster or the second cluster.

Each cluster may have a cluster identifier (ID) that uniquely distinguishes the clusters from each other. Clusters may be specified by referring to their respective cluster ID. A customer may use different clusters for different types of tasks. For example, a customer may use a first cluster for launch services and may use a second cluster for executing batch jobs. The instances in the first cluster may have been optimized for running a server, and the instances of the second server may have been optimized for submitting short-lived transient jobs, like batch jobs.

Available application programming interface function calls for clusters may include CreateCluster, DescribeCluster, ListClusters, and DeleteCluster. The CreateCluster application programming interface call may cause a cluster to be created. In some cases, after the cluster is created, the front-end service 204 may provide the customer with the cluster ID of the newly created cluster. The cluster ID may allow the customer to register container instances with the cluster; for example, the customer may cause a container instance be registered to a cluster by passing the cluster ID as a parameter to a RegisterContainerInstance application programming interface call. Additionally or alternatively, the customer may specify one or more existing container instances belonging to the customer as parameters to the CreateCluster application programming interface call to cause the one or more existing container instances to be registered to the cluster in concurrence with creating the cluster. Similarly, in some cases, the customer may specify, in parameters of the CreateCluster application programming interface call, a quantity of container instances to be created and registered to the cluster upon creation of the cluster. The CreateCluster application programming interface function call is further illustrated in FIG. 7.

Once a cluster is created and running, the DescribeCluster application programming interface call may be used by the customers 202 or applications to request information about a cluster. Information returned in response to the DescribeCluster application programming interface call may include a list of what applications are running in the cluster, resources available to the cluster and their types. Information returned from the DescribeCluster application programming interface call may then be used as parameters for a StartTask application programming interface call to launch a task within the described cluster.

The scheduler 208 may be configured to launch tasks within the described cluster. Alternatively, the customers 208 may implement their own scheduler, rather than the scheduler 208, and use the information retrieved by the DescribeCluster application programming interface call in conjunction with the placement logic of the customer scheduler to make placement decisions for scheduled tasks. The customer may design and/or upload a placement algorithm to be used by his/her own scheduler, or may select from a list of possible placement algorithms provided to the customer by the computing resource service provider. The container service 200 may determine, based on available resources, whether to accept or reject placement decisions made by the customer scheduler.

The scheduler 208 may be a multitenant service configured to optimally schedule a set of tasks to run with a cluster. In this way, the customers 202 need not choose where the tasks should be executed. The placement scheme of the scheduler 208 may be configured to distribute tasks evenly over the cluster (e.g., round robin fashion, stochastic distribution scheme, etc.), and may be configured to distribute tasks based on a current or projected resource consumption by the cluster, in order to make the most efficient use of available resources. The scheduler 208 may obtain cluster manager metadata and other information about the availability of the container instances 218 in a cluster via the container manager backend services 214. The cluster manager metadata and other information may include data about the current state of the container instances 218 assigned to the cluster, available resources within the container instances, containers running within the container instances, and other information usable by the scheduler 208 to make placement decisions. The DescribeCluster application programming interface call may cause the cluster manager backend service to provide the cluster metadata for the specified cluster.

The scheduler 208 may distribute tasks based at least in part on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific cluster or specific cluster instances or may have priority for resources over other tasks. Task distribution based on affinity/anti-affinity include assigning "tags" indicating relationships between containers, container instances, and tasks. As an example of distribution based at least in part on affinity, two container instances may be tagged as "general" and one container instance may be tagged as "database." In a task definition, a task could be specified with a "general" launch constraint providing affinity that the task is to be launched into one (or more) of the container instances tagged as general. As an example of task distribution of anti-affinity, certain container instances may be tagged as "secure-credit-card-processing" and certain other container instance may be tagged as "http-website." Because http-website containers may be serving traffic from untrusted outside entities, it may be desirable not to share such containers with credit card processing tasks. Thus, a task definition be configured to indicate that "http-website" is anti-affinity to credit card processing tasks to ensure that credit card processing containers are not launched in "http-website" tagged container instances. In this example, the scheduler 208 can be configured to parse any tags in a task definition and use it to filter out container instances that do not meet the criteria associated with the tag. Next, the scheduler 208 can select a container instance from the filtered set to host the container.

In some embodiments, the scheduler 208 may communicate directly with the container agents 222 to launch tasks. In other embodiments, the scheduler 208 may communicate to the agent communication services 220, which may then relay the communication to the container agent 222. In still other embodiments, the scheduler 208 may communicate placement decisions to the container manager backend services 214, which may relay communicate directly to the container agent 222 or to the agent communication services 220. As noted, in some embodiments, the customers 202 may alternatively implement their own schedulers for task management rather than using the scheduler 208.

In some cases, containers may be configured to compete for resources and, in cases of conflict, containers associated with certain security roles may have priority over other containers. Note that in all cases, the placement scheme may take the available resources in the container instances and the resource requirements of the container into account. For example, a container instance may not be selected for particular tasks if the particular tasks have resource requirements exceeding the available resources in the container instance. In some implementations, however, the container instance may still be selected but launching of the particular tasks may be delayed until enough resources become available within the container instance to support running the particular tasks.

Containers may also be configured to utilize other resources provided by the computing resource service provider. For example, each container may be configured with a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the container service may be configured to integrate with a load-balancing service to load-balance workloads directed at the containers. For example, a customer may present a list of internet protocol addresses associated with virtual networks of the customer's containers and/or customer instances to a load-balancer of the load-balancing service and instruct the load-balancer to balance workloads between the internet protocol addresses. In addition, the container service may be integrated with an auto-scaling service to allow resources utilized by the containers to be dynamically adjusted as needed.

For example, a customer may implement multiple schedulers for a single cluster, and the multiple schedulers determine for which instances within the cluster to launch containers. The multiple schedulers may compete with each other according to a placement scheme, such as by using an optimistic concurrency control method for determining where to launch containers. For example, each scheduler using optimistic concurrency may assume that, in general, containers will not interfere with each other, and in a situation where one container has modified data that another container has read, the reading container may restart and re-read the modified data.

In some cases, a scheduler may be configured to maximize available resources. For example, a cluster may be utilized primarily for running long-running services, and a need arises for running one or more short-lived batch jobs. In such an example, a scheduler configured to maximize available resources may look for an instance with just enough processing power to support the batch jobs as a best-fit location for the batch jobs. Alternatively, the scheduler may look for an instance utilizing the least of its processing power and schedule the batch jobs with this instance.

In some implementations, a meta-scheduler may be configured to run hierarchically on top of one or more schedulers, and the meta-scheduler may decide where to launch the batch jobs. For example, in an implementation there may be two types of tasks: short term batch job tasks and long-term services. The two types of tasks may have different placement rules, such as it may be desirable to distribute the service tasks evenly among the available container instances in one or more specified clusters, whereas the batch job tasks may be configured to run in any available container instance with space processing cycles. In some cases, a different scheduler may be assigned to each set of placement rules. However, in cases where such placement rules are competing or in conflict with each other or in cases where an appropriate scheduler must be determined and assigned to a particular task, the meta-scheduler may determine which competing task should prevail, synchronize information between schedulers, or determine the appropriate scheduler for placing a task.

The cluster may be managed through application programming interface calls made to the front-end service 204. For example, an application programming interface call could be made to request a list of what clusters are available and what containers may be running on which clusters. The ListClusters application programming interface call may list all clusters to which a customer has access. The DeleteCluster application programming interface call may delete a specified cluster and is further described in reference to FIG. 14.

Available application programming interface function calls for container instances may include RegisterContainerInstance, DescribeContainerInstance, and DeregisterContainerInstance. A RegisterContainerInstance application programming interface call may be used by a container agent of a container instance to register the container instance with a cluster manager once the container instance is instantiated. In some implementations, the cluster manager is comprised of metadata about the clusters (e.g., the grouping of container instances). In other implementation, the cluster manager may comprise configuration management software installed by a customer or made available by the computing resource service provider. The scheduler may then refer to the container instances 218 registered with the cluster manager when determining into which container instance the containers should be launched. The RegisterContainerInstance is further described in reference to FIG. 8. The DescribeContainerInstance application programming interface call may return information about the container instance, including resources available to the container instance and running tasks within the container instance.

Because containers may be run in any available container instance with sufficient resources in the cluster, containers may be scaled up or down within the cluster as needed, provided enough container instances are available. If the number of container instances in a cluster is insufficient, additional container instances may be created and registered to the cluster through the cluster manager. If an overabundance of container instances exist in the cluster, some container instances may be deregistered from the cluster via the cluster manager. The DeregisterContainerInstance application programming interface call may be used to deregister, from a specified cluster, a container instance that was registered using the RegisterContainerInstance application programming interface call. The DeregisterContainerInstance is further described concerning FIG. 13.

Available application programming interface function calls for task definitions may include RegisterTaskDefinition, DescribeTaskDefinition, ListTaskDefinitions, and DeregisterTaskDefinition. The RegisterTaskDefinition application programming interface call may be used to register a task definition for launching tasks and is further described in conjunction with FIG. 9. The DescribeTaskDefinition application programming interface call may be used to return information about the task definition, including the contents of the task definition file. The ListTaskDefinitions application programming interface call may return a list of task definitions available to a customer, or may return a list of task definitions associated with a particular cluster ID or container instance ID. The DeregisterTaskDefinition application programming interface call may deregister a task definition that was registered using the RegisterTaskDefinition application programming interface call and is further described concerning FIG. 12.

Application programming interface function calls for tasks may include StartTask, DescribeTask, ListTasks, and StopTask. A customer may pass a task definition file (or their respective identifiers) as parameters to the StartTask application programming interface call and may further specify a container instance or cluster to launch one or more tasks within the container instance or cluster. For example, the customer may have obtained one or more container instance IDs of a cluster in response to a DescribeCluster application programming interface call, and may specify to execute a task definition file on the one or more identified container instances. If a customer is running tasks directly, they may call the StartTask application programming interface and specify the container instance to launch into. Alternatively, the scheduler 208 may use the StartTask application programming interface to launch tasks. In addition, the customers 202 may configure their own scheduler to use the StartTask application programming interface to launch tasks.

The scheduler 208 or customer-installed scheduler may also be configured to start tasks within a task definition file, and determine where to place the tasks within the cluster. For example, the scheduler 208 may determine to distribute tasks evenly between the container instances of the cluster, distribute tasks in some chi-squared distribution, or may distribute tasks among container instances of a cluster according to some other heuristic or set of constraints. Parameters passed to the StartTask application programming interface call may specify, such as by passing a task definition file outlining multiple tasks, that multiple tasks should be started. In some implementations, the customer 202 may, rather than specify a single cluster or container instance, specify a list of clusters or container instances and the scheduler 208 may determine in which of the container instances to execute the tasks. The StartTask application programming interface call is described in further detail in reference to FIG. 10.

The DescribeTask application programming interface call may be used to return information about a running tasks from the container agents 222, including information about allocated resources, age, and running state. The ListTasks application programming interface call may be used to return a list of all tasks running, or a list of all tasks running in a specified cluster or container instance. The StopTask application programming interface call may be used to command the container agents 222 to stop specified running tasks started using the StartTask application programming interface call. The StopTask application programming interface call is further described concerning FIG. 11.

The container service 200 may interact with an authentication system of the computing resource service provider, such as the authentication system 1518 of FIG. 15, to authenticate application programming interface calls made to the front-end service 204. In some embodiments, separate security groups and security roles may be configured and assigned to different containers on a single host. The container service 200 may also be configured to launch containers and container instances 218 within a virtual private cloud.

In some embodiments, the containers may be configured to attach to other services of the computing resource service provider, such as block-level data storage services and/or on-demand data storage services. In some cases, containers may be configured to share attached services with other containers. As an example, a container instance of a customer may be mapped to a block-level storage volume of a block-level storage service of a computing resource service provider, and the containers within the instance may each be configured to be able to read from and/or write to the block-level storage volume. In some examples, the block-level storage volume may be shared between multiple container instances, such as all container instances within a cluster or multiple clusters, such that container instances within the cluster or clusters may all be able to share the block-level storage volume with their running containers. As another example, a container instance may be mapped to 20 different block-level storage volumes, but only two of the block-level storage volumes are specified for the containers.

The template service 206 may be configured to allow the customers 202 to define a task definition for their containers. In some examples, a "task definition" may refer to a script or set of metadata that may define a group of containers; e.g., the number of containers, their types, their components, their relationships to other containers, information describing associated instances, and other metadata. Task definitions may also specify that groups of containers are to be launched in coordination. The template service 206 may receive task definitions from the customers 202, store the task definitions in the database 216, and allow the customers 202 to create, view, update, delete, and otherwise manage their task definitions.

The template service 206 may grant the customers 202 the ability to define a task definition. The template service 206 may allow customers with the ability to provide the task definition by uploading a task definition file or may provide the task definition by allowing customers to select from various options and/or change default settings to dynamically create a task definition file. The template service 206 may allow customers to register a task definition. The template service 206 may also provide an editing interface for editing currently registered task definitions. The template service 206 may register the task definitions at least in part, by providing the task definitions to the container manager backed service 214 to be stored in in the database 216.

In some examples, a "fleet" may refer to a set of computer systems (virtual or physical) running instances, such as the container instances of the present disclosure or other applications of the container service 200. A fleet may be subdivided into sub-fleets, and each sub-fleet may be supported by a container manager back-end service and an agent communication service dedicated to that sub-fleet. The agent communication services 220 may be configured to communicate with the container agents 222 and telemetry agents 224 running on container instances within the sub-fleet.

The container manager backend services 214 may be configured to provide other management services and resources to the sub-fleet on the backend, such as the cluster management software or cluster manager metadata described in the present disclosure. The container manager backend services may be configured to receive task definitions from the template service 206, store the task definitions in the database 216, receive cluster manager metadata from container instances 218 or the agent communication services 220, and provide task definition information and the cluster manager metadata to the scheduler 208 or a customer installed scheduler upon request. The container manager backend services may be configured to provided information about a specified cluster, such as cluster manager metadata, in response to a DescribeCluster application programming interface call.

The agent communication services 220 and container manager backends 214 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 218 per sub-fleet. In some cases, each sub-fleet may represent a single cluster. In other cases, clusters may span multiple sub-fleets. In still other cases, each sub-fleet may host more than one cluster. The router service 210 may be configured to route requests from the front-end service 204 to the appropriate sub-fleet. In some embodiments, the router service 210 may route requests to a single sub-fleet. In other embodiments, the router service may route requests between multiple sub-fleets.

The telemetry service 212 may be configured to aggregate control group metrics (e.g., information about the processes running within the containers) and container logs and provide the aggregated metrics and logs to a resource monitoring service to allow the customers 202 to monitor resource utilization, such as processor, storage, and network usage, of their respective container instances. Control group metrics include information such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers.

The container manager backend services 214 may be configured to receive placement requests from the customers 202 for their containers through the front-end service 204, and may ensure that the requested resources are available for the containers. The container manager backend services 214 may then write the desired container state to the database 216. In some implementations, the container manager backend services is responsible for the cluster manager metadata, which may be stored in the database 216, and provided to the scheduler 208 or customer-installed scheduler when requested. Additionally, the container manager backend services may receive information from individual container agents 222 regularly, such as information related to life-cycle events and heartbeats (e.g., periodic signals sent by the container agents 222 to indicate normal operation). In some cases, this information may be communicated to the appropriate component or entity through the front-end service 204. In some implementations, the container agents communicate this information through the agent communication services 220, which may then communicate the information directly to the container manager backend services 214, or, in other implementations, stores the information in the database 216 whereupon the container manager backend services 214 can read the information.

The database 216 may be a data store located within the distributed computing system of the container service 200, or may be a data store of a different service of a computing resource service provider, such as a relational database service. In some embodiments, the database 216 may be a set of distributed databases that share a transaction log. The agent communication services 220 may be configured to track the status of all agents in a cluster, and may push run commands and state transitions no its respective instance. In some embodiments, communication by other components of the container service, with containers and the container instances 218 is performed through the agent communication services 220. Each fleet may have at least one agent communication service which relays the messages between the container agents 222 of the fleet.

The container agents 222 may be software applications configured to run in instances owned by the customers 202 and may act as an interface between their respective container instances 218 and other services and entities, such as the container manager backend services 214. For examples, the container agents 222 may act as intermediaries between the running tasks of their respective container instances 218 and other entities and services such that all communication to or from a container passes through the container agent. In this manner, the container agent may be configured to interpret and translate commands between the container and a particular container encapsulation system running with the container service 200. This may allow changes to be made to the particular container encapsulation system without requiring updates to be made to the tasks or task definitions; i.e., only the container agents 222 may need to be updated to reflect the changes to the particular encapsulation system.

Thus, each of the container instances 218 may have a respective container agent running within it that communicates with a respective container manager backend service. The container agent may, itself, be a container configured to monitor its respective container instance and may provide information to the system usable to launch containers, track containers, and monitor cluster state. The container agent may also perform functions of registering and deregistering its respective container instance, starting and stopping tasks within its respective container instance. The container agent may also be configured to respond to requests to describe its respective container instance, requests to list tasks running in its respective container instance, and requests to describe tasks running in its respective container instance. The container agents 222 may be configured to monitor the health of the containers within the respective container instances 218 (e.g., report heartbeats signaling that the container instance is operating, report lifespans of containers, and report container statuses and occurrences of container errors), and may further be configured to perform actions based on the occurrence of certain events. For example, if a container agent detects that a container has encountered an error and ceased operation, the container agent may automatically cause a new container to be generated to replace the malfunctioning container. In other embodiments, the scheduler 208 may take certain actions in response to events reported to it by the container agents 222. In the above example, it may be the scheduler 208 that causes a new container to be generated to replace a malfunctioning container. The customer owner of the container may specify conditions, events, and actions for the scheduler 208 and/or container agent. For example, the customer may specify if the customer's containers cease operations, such as due to an error or power outage, that the scheduler 208 or container agent is not to generate replacement containers for the inoperative containers. Instead the customer may specify that the scheduler 208 or container agent is to notify (e.g., by changing a status indicator, providing an e-mail message, etc.) the customer of the occurrence of the problem.

The container agents 222 and/or the telemetry agents 224 may be configured to launch automatically when their respective container instances 218 are instantiated. If a new container encapsulation system is implemented by the container service 200, the only changes required for the container instances 218 and containers may be for new container agents configured to be compatible with the new container encapsulation system to be created and the container agents 222 to be swapped for the new container agents. In such a case, the customers 202 should be able to use the same application programming interfaces with the container service 200, and the new container agents should be configured to support the same application programming interfaces without the customers 202 being aware of the change to the new encapsulation system.

The container agents 222 may be polled by the container encapsulation system to communicate information to the container encapsulation system. The container agent 222 may register or deregister container instances 218, receive instructions from the container manager backend services 214, and ensure that a telemetry agent 224 has been started and is running. The container agent 222 may also enable updates to containers in the container instances 218 and monitor the state of containers running in the container instances 218 via an event stream.

The telemetry agent 224 may be configured to collect telemetry data, such as a set of control group metrics and container encapsulation system logs, and provide such telemetry data to the telemetry service 212. The telemetry service 212 may be configured to aggregate data received from the telemetry agent 224 for a resource monitoring service of a computing resource service provider, which, in turn may be configured to trigger an alarm or take some other action based on the aggregated data. For example, if the telemetry agent 224 communicates a log indicating an error state of a container to the telemetry service 212, the telemetry service 212 may provide the error state to the resource monitoring service which react by triggering an alarm notifying the customer that the container has experienced an error. As another example, the resource monitoring service may trigger an alarm if one of the metrics (e.g., central processing unit usage by processes of a container) provided by the telemetry service 212 exceeds a threshold. Note, in some implementations, the telemetry service may be configurable to specify the alarm conditions 212 and thresholds. Examples of triggering an alarm include providing a text message to the customer owner of the container, e-mailing the customer owner of the container, and/or displaying a visual indicator (e.g., a red icon, popup window, etc.) on an interface displaying container statuses.

The container service 200 may also allow data volumes to be linked to containers. Such data volumes may be designated directories within a container, and may be shared with one or more other containers, that may bypass the default file system of the container instance. In this manner, data may be stored persistently and shared among other containers within the container instance. The data volume may be configured through entries in the task definition file. In some implementations, creation and selection of one or more data volumes for a container may be achieved through a user interface configured for that purpose that communicates to the front-end service 204. The container service 200 may utilize other data storage services, such as the on-demand data storage service 1514 or the block-level data storage service 1510 of FIG. 2, of the computing resource service provider for providing the storage for the data volume. In other implementations, the data volumes may utilize the native storage of the container instance for the data volume.

The container service 200 may be integrated with other services of a computing resource service provider. For example, the container instances may be tagged and/or assigned to an auto-scaling group of an auto-scaling service of the computing resource service provider. In this manner, the auto-scaling service may monitor resource usage by the container instances and may dynamically adjust/allocate resources as needed, such as a sudden increase in resource demand by the container instances. Likewise, the container service 200 may integrate with a load-balancer service of the computing resource service provider. For example, the load-balancer service may distribute traffic to the containers or container instances in order to balance the workload between the container instances.

As an example, a customer may operate a website using container instances 218 assigned to an auto-scaling group. The website may receive requests from multiple users over the Internet, and a load balancer of the load-balancer service may distribute the requests to the container instances 218 according to a load-balancing distribution scheme. The load-balancer service may be a computer system or virtual computer system configured to distribute the requests to the container instances 218 assigned to the load balancer in order to optimize resource utilization and/or avoid overloading any particular host computer. For example, the load balancer may include physical hardware connected to a server rack or otherwise included in a data center. In another example, the load balancer may include one or more virtual machines supported by a host computer. At the same time, the auto-scaling service may detect whether more or fewer resources are needed by the container instances 218 due to the incoming requests, and may allocate more or fewer resources to the container instances 218 as needed.

Figure 3:
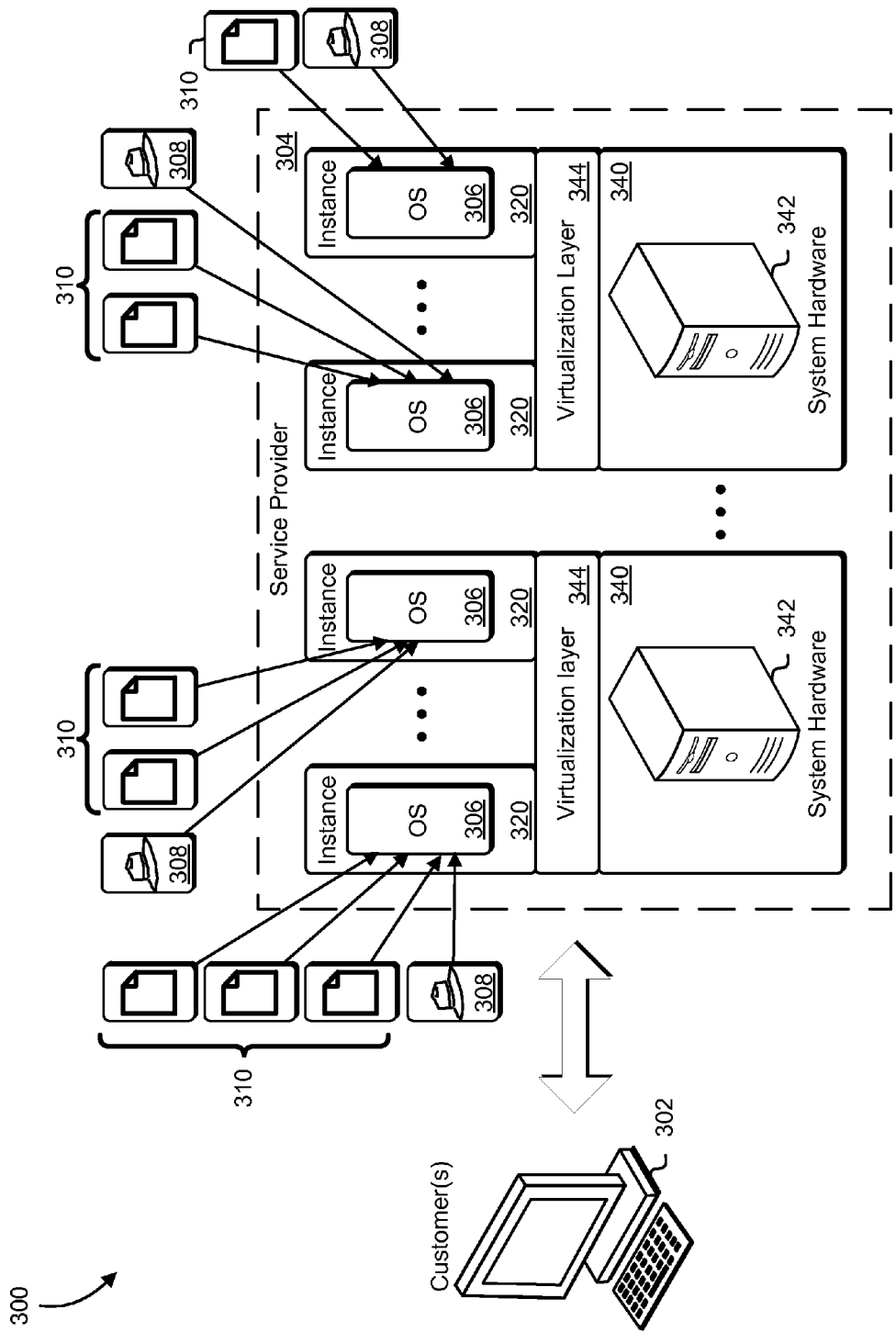
FIG. 3 illustrates an example of virtualization of the container service in accordance with an embodiment.

FIG. 3 illustrates an aspect of an environment 300 in which an embodiment may be practiced. Specifically, FIG. 3 depicts a container service, similar to the container service 1522, executing a plurality of virtual machines configured as container instances 320 in accordance with at least one embodiment. The container service may provide system hardware 340 to customers 302 of a computing resource service provider 304 providing the container service to perform computation services within containers 310. The system hardware 340 may include one or more hosts 342, also referred to as host computer systems. Each of the hosts 342 may be any device or equipment configured to execute instructions for performing data computation, manipulation, or storage tasks, such as a computer or a server. The hosts 342 may be equipped with any needed processing capability, including one or more processors, such as a central processing unit, a graphics processing unit, or a digital signal processor. The hosts 342 may also be equipped with memory (e.g., static and dynamic memory), buses, and input and output ports that are compliant with any handshaking, communications or data transfer protocol. The system hardware 340 may also include storage devices, such as storage disks and tapes, and networking equipment. The storage devices may be network storage devices managed by a data storage service, such as a block-level data storage service 1510 described in conjunction with FIG. 15.

Virtualization layers 344 in the system hardware 340 enables the system hardware 340 to be used to provide computational resources upon which one or more container instances 320 may operate. The virtualization layer 344 may be any device, software, or firmware used for providing a virtual computing platform for the container instances 320. The virtualization layers 344 executing on the hosts 342 enables the set of system hardware 340 to be used to provide computational resources necessary to support the container instances 320. Furthermore, the physical host 342 may host multiple virtualization layers of the same or different types on the same system hardware 340. Each container instance 320 may include various virtual computer components, such as one or more virtual processors, virtual memory, and virtual storage. The container instances 320 may be provided to the customers of the computing resource service provider 304 and the customers may run an operating system 306 and applications on each of the container instances 320. An example of a virtualization layer 344 includes a hypervisor.

Requests may be received by a request interface, such as the front-end service 204 of FIG. 2 operated by the computing resource service provider 304. The request interface 314 may direct the request to the appropriate container instance. Each container instance 320 may include one or more software agents 308. The software agents 308 may be configured to allow the customers 302 to manage their respective containers 310 and container instances. The software agents 308 may be further configured to perform logging of events and gather telemetry data related to the containers 310 and container instances 320. Examples of such software agents 308 are the container agents 222 and the telemetry agents 224 described in conjunction with FIG. 2.

The operating systems 306 may be any operating systems suitable for running within the container instances 320 and that provide isolation technology that enable containerization schemes to isolate virtualization instances, such as the containers 310, from other processes running under the operating system 306. Examples of such operating systems include various implementations of Linux operating systems that support resource isolation features in the Linux kernel. As noted, the containers 310 may be virtualized instances within the operating systems 306 launched from application images in accordance with one or more task definitions, and may be allocated resources from their respective container instances 320.

Figure 4:
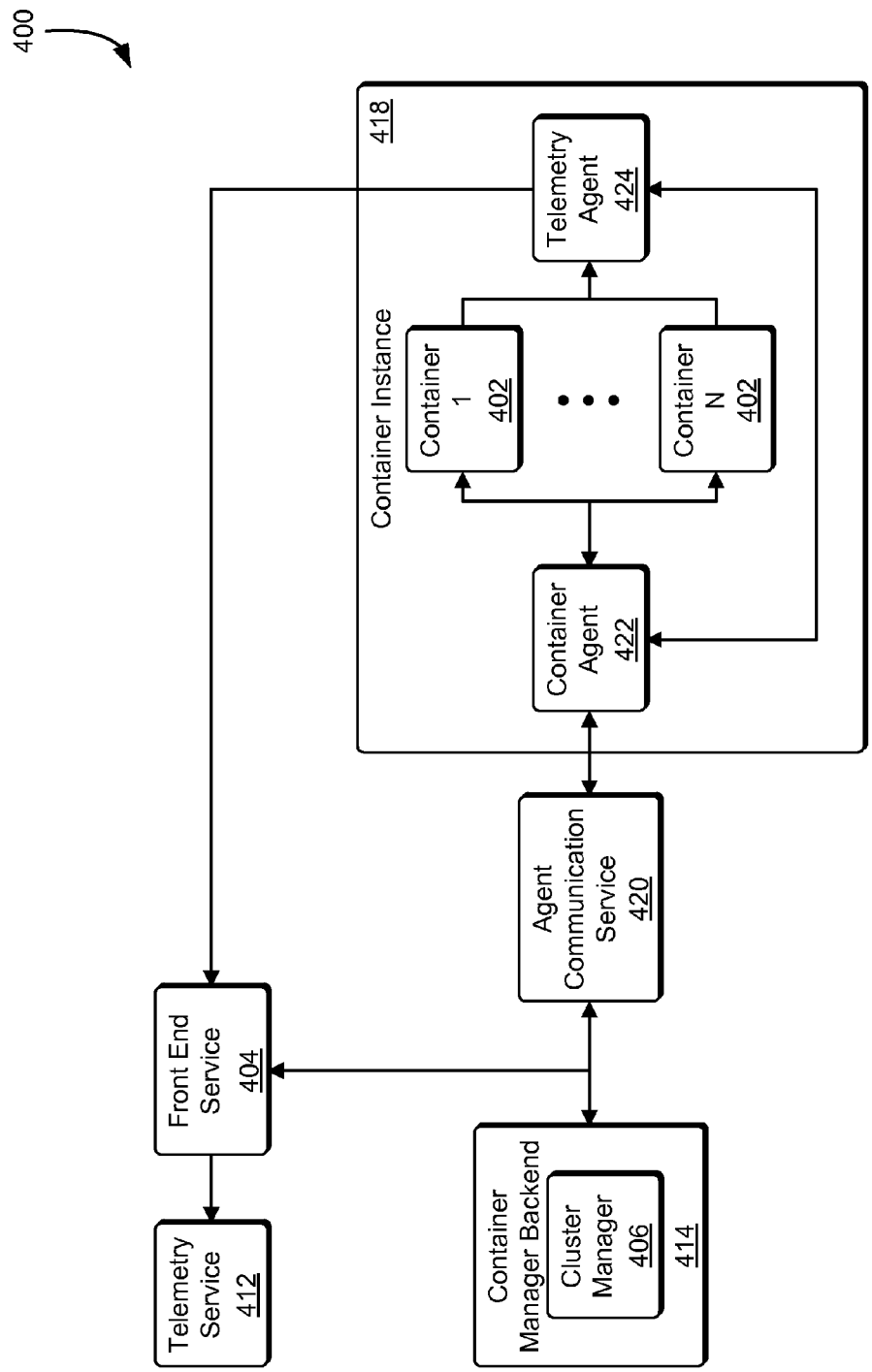
FIG. 4 illustrates an example of a container instance in accordance with an embodiment.

FIG. 4 illustrates an aspect of an environment 400 in which an embodiment may be practiced. As illustrated in FIG. 4, the environment 400 may include a set of containers 402 launched within a container instance 418 being monitored by a container agent 422 and providing metrics and log information to a telemetry agent 424. The container agent 422, in turn, may communicate monitoring information via an agent communication service, such as the agent communication service 420, similar to the agent communication services 220. The container agent 422 may also be in communication with the telemetry agent 424 and the container agent 422 may periodically monitor the health of the telemetry agent 424 to ensure that the telemetry agent 424 is running. If the telemetry agent 424 stops running or otherwise encounters an error, the container agent 424 may restart the telemetry agent 424 as needed. In some embodiments, monitoring information from the container agent 222 may be provided to the front-end service 204 in response to an application programming interface call. The telemetry agent 424 may communicate the metrics and log information to a telemetry service 412, similar to the telemetry service 212. In some embodiments, the telemetry agent communicates directly to the telemetry service 412, while in other embodiments the telemetry agent 424 may communicate with the telemetry service 412 via the front-end service 404.

The containers 402, similar to containers discussed elsewhere in the present disclosure, may be running virtualization instances (also referred to as tasks) of varying lifespans (e.g., short-term batch jobs, long-term background processes, etc.) that have been isolated from other processes within the container instance. Metrics about the containers 402 may be gathered by the telemetry agent 424, aggregated, and provided to the telemetry service 412. The container agent 422 acts as a go-between between the containers 402 and resources, services, and other entities outside the namespace of the containers 402. In some implementations, the containers 402 may be configured to share external resources, such as block-level data storage volumes. In some of these implementations, access to and communication with the shared external resources by the containers 402 may be made through the container agent 422. In other implementations, the container instance 418 or operating system of the container instance 418 may support allowing the containers 402 to access or communicate with the shared resources without going through the container agent 422.

The cluster manager 406 may be metadata or cluster management software that is configured with a set of rules for determining within which container instance 418 that containers 402 should be launched. For example, when the container instance 418 is instantiated, its container agent 422 may update the cluster manager 406 with information indicating that the container instance 418 is available for hosting containers for a customer. Thereafter, if a request to launch a container is received through the front-end service 404 from the customer or from a scheduler, a scheduler may refer to the cluster manager 406 to select the container instance 418 and tell the container agent 422 of the container instance 418 to launch the container. The cluster manager 406 may also be configured to specify what actions should be taken in response to certain types of container events. For example, if one of the containers 402 malfunctions and/or ceases operation, the container agent 422 may reference the cluster manager 406 to determine whether to re-launch the malfunctioning or inoperative container.

Note, in some embodiments, the scheduler may communicate with the agent communication service 420 or directly to the container agent 422 to instruct the container agent 422 to launch tasks. In other embodiments, the scheduler communicates the placement and launching instructions to the container manager backend 414, which subsequently causes the containers to be launched according to the placement orders from the scheduler, such as by communicating the launch instructions to the container agent 422 directly or through the agent communication service. The cluster manager 406 may be multitenant; e.g., the cluster manager 406 may be configured with information for managing clusters of multiple customers of the computing resource service provider.

As noted, the container manager backend 414 may be configured to provide an environment for other processes supporting the containers and container instances in the particular sub-fleet, such as the cluster manager 406. The container agent 422 may be configured to provide lifecycle and health information about the containers 402 being monitored by the container agent 422 to the cluster manager 406. In some implementations, the container agent 422 collects metrics and log information and passes this information to the telemetry agent 424 or directly to a telemetry service. As well, in some implementations, the container agent 422 may update the cluster manager 406 through the agent communication service 420. In some embodiments, communication between the container agent and outside components may be a one-way communication from the container agent 422 to the agent communication service 420 and the outside components. In other embodiments, communication between the container agent 422 and the agent communication service 420 is bi-directional. In other implementations, the container agent 422 may directly update cluster manager 406 without going through the agent communication service 420. Note that the container agent 422 may be a software container that is launched when the container instance is created, and in other cases the container agent 422 may be a process running under the operating system of the container instance in communication with the containers 402.

As noted, the telemetry agent 424 may be configured to gather metrics and log information about the containers 402 running within the container instance 418 and pass the gathered metrics and log information to the telemetry service 412. In some implementations, the telemetry agent 424 may be a separate container of its own that launches when the container instance 418 is created. In other implementations, the telemetry agent may be a process running under the operating system of the container instance 418 and configured to receive metrics and log information directly through the containers 402 or through the container agent 422. Note that not all implementations of the present disclosure require a telemetry agent 424 and/or telemetry service 412.

Figure 5:
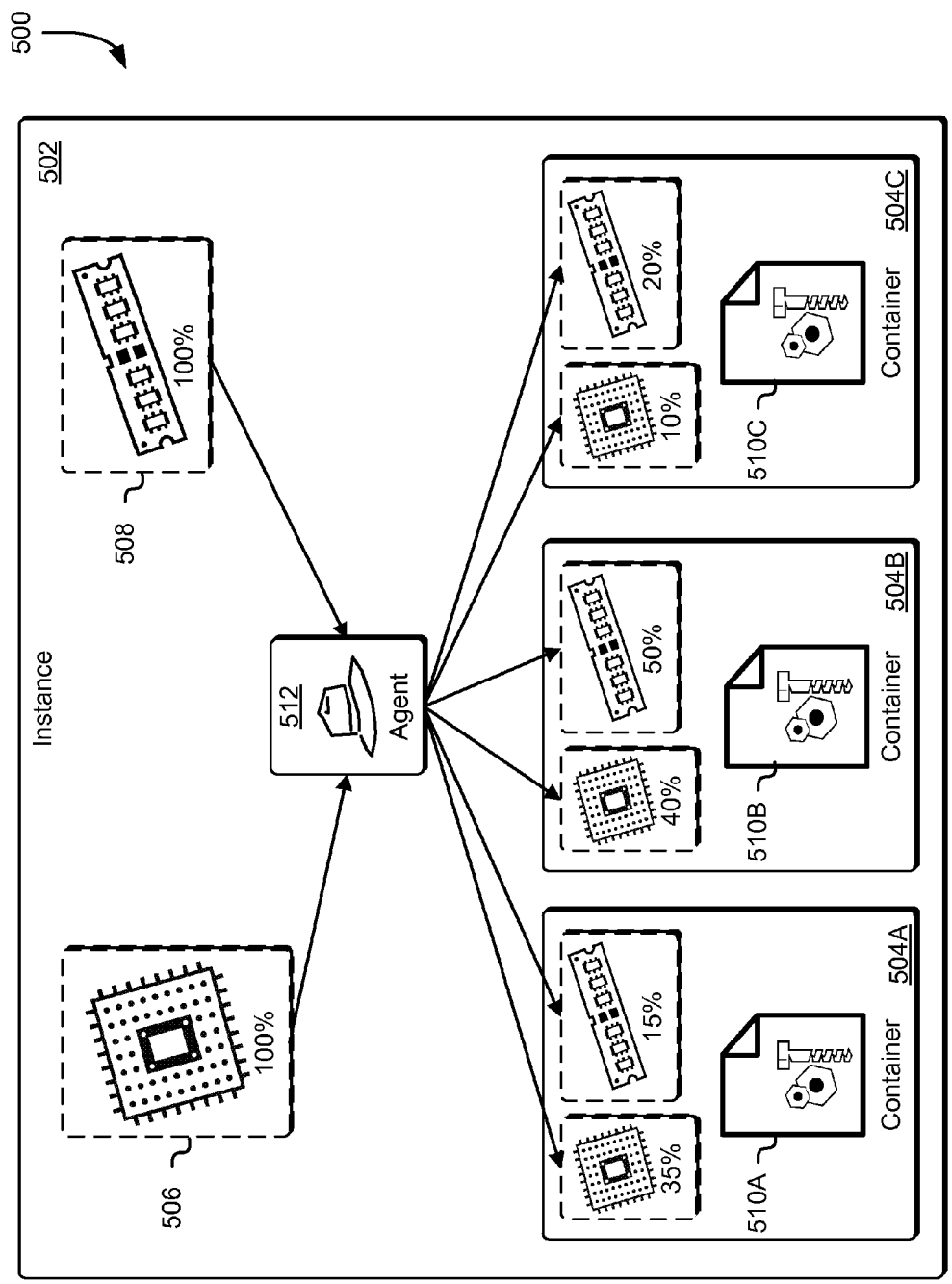
FIG. 5 illustrates an example of resource allocation within a container instance in accordance with an embodiment.

FIG. 5 illustrates an example 500 of resource allocation between a container instance 502 and containers 504A-04B within the container instance. The container instance 502 may be a computer system instance (virtual or non-virtual) configured to support container instances (containerization). The container instance 502 is depicted with an allocated amount of processing resources 506 and an amount of memory resource 508. Each of the containers 504A-04C may be launched within the container instance 502 from a software image and allocated amount of resources from the pool of resources of the container instance 502, such as the processing resources 506 and the memory resources 508. As shown, the container 506A has been allocated 35% of the processing resources 506 and 15% of the memory resources 508 of the container instance 502 in order to run its processes 510A. Similarly, the container 506B has been allocated 40% of the processing resources 506 and 50% of the memory resources 508 of the container instance 502 in order to run its processes 510B. Likewise, the container 504C has been allocated 10% of the processing resources 506 and 20% of the memory resources 508 of the container instance 502 in order to run its processes 510C. In sum, 85% of the processing resources 506 and 85% of the memory resources of the container instance 502 have been allocated to the containers 504A-04C.

The container instance may include a container agent 512. The container agent 512, as noted, may be a separate running container configured to interface between the containers 504A-04C and entities external to the container instance 502. The amount of resources to be allocated to the containers 504A-04C may be specified within the task definition. A scheduler may determine the container instance 502 in which to launch the containers 504A-04C, based on, as has been described in the present specification, a placement scheme and/or available resources within a set of container instances of which the container instance 502 is a member. Thereupon, the scheduler may notify the container instance 502 or the container agent 512, to allocate the amount of resources specified by the task definition to the containers 504A-04C, and the container agent 512 may allocate the resources to the containers 504A-04C as directed by the scheduler. Additionally, once the resources are allocated for each of the containers 504A-04C, the scheduler may notify the container instance 502 or the container agent 512 to launch each of the containers 504A-04C as running containers (i.e., tasks) within their own namespace and with exclusive use of their respectively allocated resources. Upon being notified, the container agent 512 may launch the containers 504A-04C within the container instance 502 as directed by the scheduler.

Figure 6:
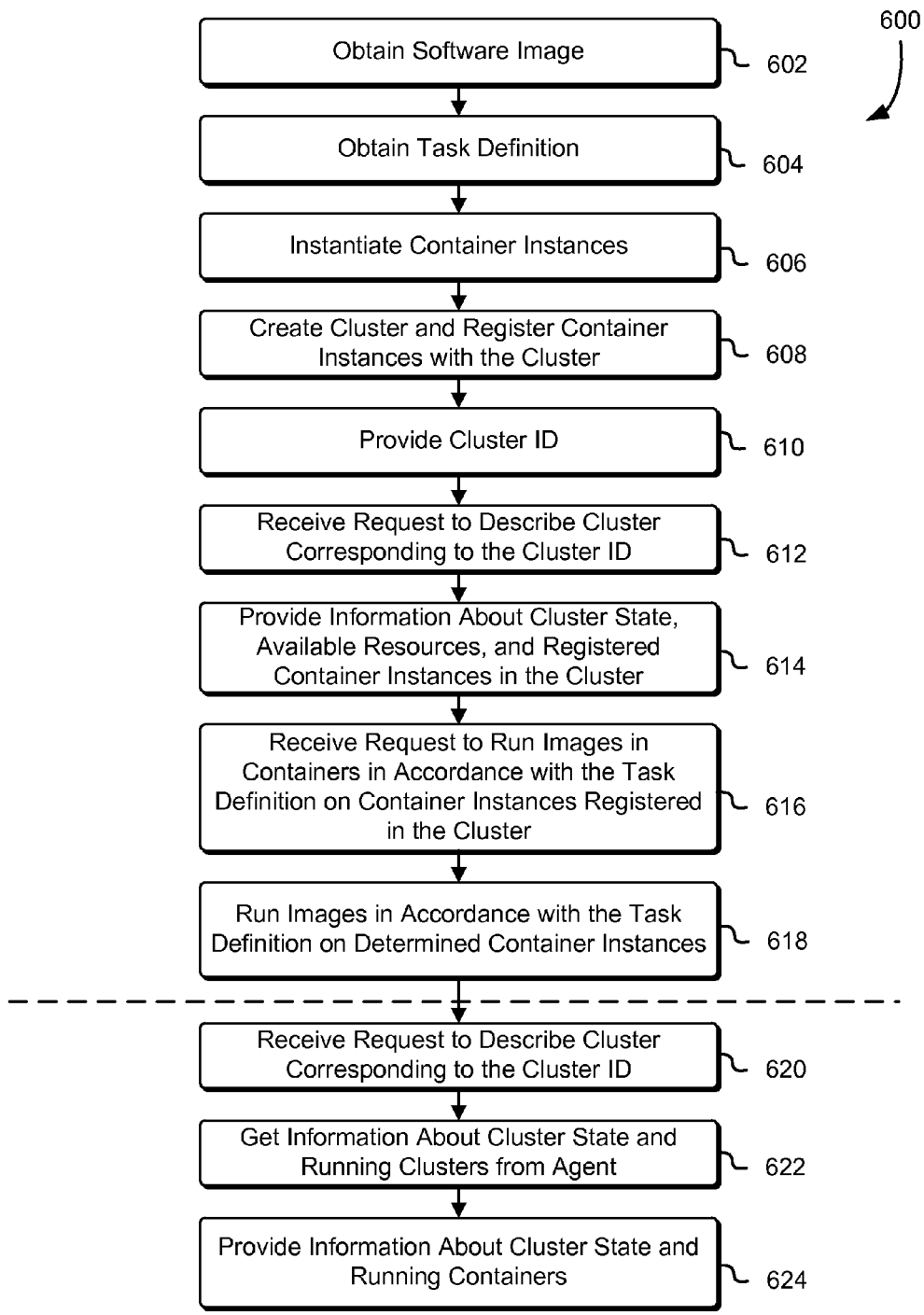
FIG. 6 is a block diagram that illustrates an example workflow for launching a task on a cluster in accordance with an embodiment.

FIG. 6 is a block diagram illustrating an example of a process 600 for launching tasks into a cluster in accordance with various embodiments. The process 600 may be performed by any suitable system such as a server in a data center, multiple computing devices in a distributed system of a computing resource service provider, or any electronic client device such as the electronic client device 1602 described in conjunction with FIG. 16. The process 600 includes a series of operations wherein a software image and a task definition for a container is obtained, a cluster is created and container instances are registered to the cluster, the cluster is described, the image is launched within determined container instance in accordance with the task definition, and the cluster's description is updated.

In 602, a computing resource service provider receives a software image from a customer of the computing resource service provider. As noted, a software image may refer to data representing the entire state of a software application at the time it was imaged, such that the software application may be restored to this point by restoring/launching the software image. In some cases, the operations in 602 may be to obtain an executable installation or application file rather than an image. Note, in some cases, receiving the software image includes having a software image accessible to the computing resource service provider, such as through a resource location specified in a task definition file. In some cases, the software image may be stored in a data store, such as the database 216 of FIG. 2 of the computing resource service provider.

In 604, the computing resource service provider may receive a task definition describing the tasks/containers to run within one or more instances. The task definition may be in the form of a task definition file or may be generated by the computing resource service provider in response to options selected by the customer through a user interface. The task definition may specify information, such as a description of the tasks/containers, locations of where to find images for the tasks/containers, amounts of resources allocated to the tasks/containers, shared resources, relationships between other containers, and other information. As noted, the task definition may be stored in a data store, such as the database 216 of FIG. 2 of the computing resource service provider.

In 606, the container instances may be instantiated. As has been noted, container instance may be virtual machine instances that support containerization. In some cases, instantiating the container instances includes launching a container agent within the container instance. The container agent may run under an operating system of the container instance, and the container agent itself may be a container.

In 608, one or more clusters may be created. As has been noted, a cluster may be a logical grouping of one or more container instances. Clusters may be used for various purposes, including separating tasks by function, grouping different types of container instances together, and grouping container instances based on locations of the physical host machines within the computing resource service provider infrastructure. Once a cluster is created, one or more container instances may be registered via the cluster manager as being members of the cluster. As has been noted, in some cases, container instances may be members of more than one cluster. Note that operations 606-08 may occur together or in any order. For example, a cluster may be created before container instances, and, as the container instances are instantiated, the container agents within the container instances may automatically cause the container instance to be registered with the cluster.

In 610, the computing resource service provider provides a cluster or cluster ID to the customer or other entity that may be responsible for requesting tasks to be launched. In some cases this other entity may be a scheduler, such as the scheduler 208 of FIG. 2 provided by the container service or a scheduler installed by the customer. The cluster ID may be provided in response to a request to create the cluster in 608. At other times, the cluster ID may be provided to a requesting entity that made a ListClusters application programming interface call.

In 612, a DescribeCluster application programming interface call may be received from a customer or other entity responsible for requesting tasks to be launched (e.g., a scheduler), specifying a cluster (e.g., by passing the cluster ID of 610 as a parameter) to describe. In response to the DescribeCluster application programming interface call, the computing resource service provider, in 614, may provide information about the cluster, including the number and IDs of container instances within the cluster, resources available within the cluster, resources being used in the cluster, running tasks, etc. This information may be used by the customer or scheduler to determine where (e.g., which container instance) particular tasks should be launched (e.g., to achieve certain performance goals, to balance load, etc.).

In 616, the computing resource service provider receives a request to run one or more tasks in accordance with information specified in the task definition obtained in 604. In some cases, the request may specify which container instances in which to run the one or more tasks. In other cases, the request may specify which cluster in which to run the one or more tasks and a scheduler, such as the scheduler 216 of FIG. 2, may determine into which container instance the tasks should be launched according to a placement scheme. Placement schemes may include round robin placement schemes, stochastically assigned placement, or heuristics based on resource usage or other criteria.

Once the target location of the tasks is determined (e.g., after determining instance IDs of container instance in which to launch the tasks), in 618, the tasks corresponding to software images of 602 may be launched into one or more container instances in accordance with the task definition of 604. In some cases, the launching of the tasks may be performed by the container agents running in the determined container instances. The dotted line between 618 and 620 represent that the operations below the dotted line may not be integral to the launching of tasks in a cluster but provide information about the running tasks launched in 602-18.

In 620, a request to describe the cluster may be received, similar to the request in 612. In 622, the computing resource service provider may query one or more container agents of the container instances running tasks for status information about the running tasks in the container instances. In 624, the computing resource service provider may provide the information describing the cluster in response to the request of 620, similar to the operations of 614. However, differentiated from 614, the information should now reflect the running tasks and/or effect of the resources allocated to the running tasks launched into the cluster 618. Note that one or more of the operations performed in 602-20 may be performed in various orders and combinations, including in parallel.

Figure 7:
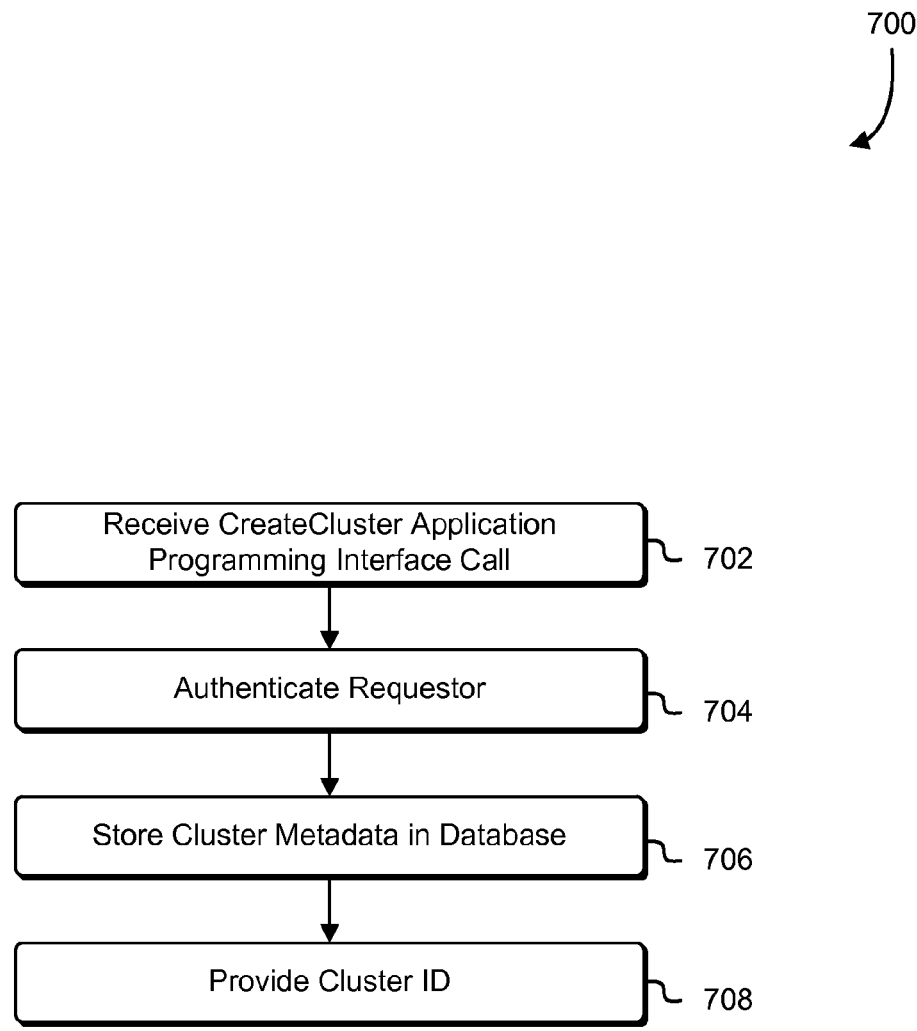
FIG. 7 is a block diagram that illustrates an example of creating a cluster in accordance with an embodiment.

FIG. 7 is a block diagram illustrating an example of a process 700 for creating a cluster in accordance with various embodiments. The process 700 may be performed by any suitable system such as a server in a data center, multiple computing devices in a distributed system of a computing resource service provider, or any electronic client device such as the electronic client device 1602 described in conjunction with FIG. 16. The process 700 includes a series of operations wherein a CreateCluster application programming interface call is received from a requestor, the requestor is authenticated, then, if authenticated, the cluster metadata is stored in a database and a cluster ID is generated and provided to the requestor.

In 702, a computing resource service provider receives an application programming interface call from a customer or other entity to create a cluster. Creating a cluster may include generating a cluster ID for the cluster, storing the cluster ID in a database along with other metadata about the cluster. In some cases, the requestor may indicate through the CreateCluster application programming interface call to register container instances with the cluster upon creation. In such cases, specified container instances (e.g., one or more container instance IDs passed as parameters in the application programming interface call) or available container instances may be registered in association with the cluster ID during cluster creation. In other such cases, if existing container instances are not specified and no container instances are available, new container instances may be instantiated and registered to the cluster during cluster creation. Note that in some implementations, the computing resource service provider may provide a customer with a default cluster; in such a case, the customer need not utilize the CreateCluster application programming interface, and may just register container instances to the default cluster unless additional clusters are required or if the default cluster is deleted.

In 704, the computing resource service provider determines whether the requestor has sufficient privileges to have the request fulfilled. For example, the requestor may have provided an identity and proof of possession of credentials as parameters with the CreateCluster application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 700 may not proceed further in the process 700. The system performing the process 700 may respond to a failure in authentication with an error message to the requestor and/or register the authentication failure in a security log. Otherwise, if the requestor is authenticated and determined to have sufficient privileges to have the CreateCluster request fulfilled, the system performing the process 700 may proceed to 706.

In 706, the system performing the process 700 may store the cluster ID and cluster metadata in a data store, such as the database 216 described in conjunction with FIG. 2. As noted, in some cases the cluster may be metadata stored in association with one or more container instances (e.g., container instances registered to the cluster). A scheduler may reference a cluster manager to determining which container instance in a cluster in which to launch a container. In some examples, the "cluster manager" refers, at least in part, to the cluster metadata. In other examples, the cluster manager may be a software application or service that manages the cluster metadata and is in communication with the scheduler. Note that in some implementations, storing the cluster metadata in the data store may cause the cluster ID to be generated. The cluster metadata may include information such as geographic region of the hosts of the container instances in the cluster, number of container instances assigned to or permitted to be assigned to the cluster, and date/time of the creation of the cluster.

Once stored, in 708, the system performing the process 700 may notify the requestor that creation of the cluster has been successful. In some cases, this notification may include additional information/metadata about the cluster, including IDs of any container instances registered to the cluster and available resources (e.g., memory and/or processing capabilities). Thereafter, the requestor, if authenticated, may utilize the DescribeCluster application programming interface call, passing the cluster ID as a parameter, and the computing resource service provider may respond by providing information, including metadata information, a list of container instances registered to the specified cluster, a list of tasks running within the cluster container instances, available resources in the cluster, resources being used in the cluster, metrics about the container instances of the cluster collected by a telemetry service, such as the telemetry service 212 of FIG. 2, task definitions associated with the cluster or cluster container instances, and other state information about the cluster.

Figure 8:
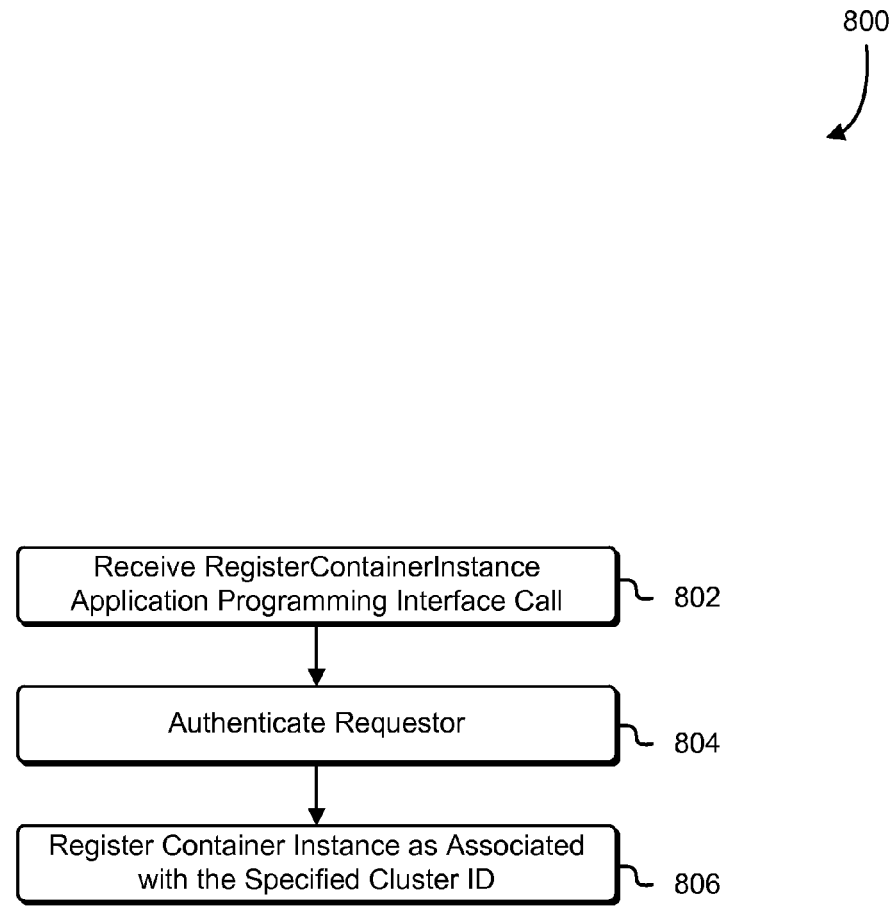
FIG. 8 is a block diagram that illustrates an example of registering a container instance in accordance with an embodiment.

FIG. 8 is a block diagram illustrating an example of a process 800 for registering a container instance in accordance with various embodiments. The process 800 may be performed by any suitable system such as a server in a data center, multiple computing devices in a distributed system of a computing resource service provider, or any electronic client device such as the electronic client device 1602 described in conjunction with FIG. 16. The process 800 includes a series of operations wherein the system performing the process 800 receives an application programming interface call from a requestor to register a container instance. The system then authenticates the requestor, registers the container instance, and notifies the requestor of the successful registration.

In 802, a computing resource service provider receives an application programming interface call to register a container instance. In some cases, this request may be received from a customer or other entity external to the container service. In some of these cases, the request is received through the front-end service and communicated to the container agent, which registers the container instance. In other cases, this request may be made from a container agent to the front-end service. For example, when a container instance is instantiated with the container agent, the container agent may automatically seek to register the container instance with a specified cluster or default cluster. Registering a container instance may include associating an existing virtual machine instance that has been specifically configured to support containerization or associating an existing virtual machine instance that has support for containerization with a particular cluster. This association may be stored in a database, such as the database 216 of FIG. 2, as a relationship between the ID of the instance and the cluster ID. In such a case, the requestor may provide the instance ID (or other identifying property) and the cluster ID as parameters in the RegisterContainerInstance function call.

In some cases, the requestor may not specify a particular existing container instance, and, in such a case, the computing resource service provider may select a container from a set of pre-instantiated container instances suitable for containerization. In other cases, if a suitable pre-instantiated container instance is unavailable, the computing resource service provider may instantiate a new container instance suitable for container instance and register the newly-instantiated container instance with the specified cluster. In some implementations, the RegisterContainerInstance application programming interface call may be used to register an existing container instance with a different cluster than a cluster to which it is currently registered. In such a case, the requestor may specify the container instance ID and the cluster ID as parameters of the application programming interface call.

In 804, the computing resource service provider determines whether the requestor has sufficient privileges to have the request fulfilled. For example, the requestor may have provided an identity and proof of possession of credentials as parameters with the RegisterContainerInstance application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 800 may not proceed further in the process 800. The system performing the process 800 may respond to a failure in authentication with an error message to the requestor and/or register the authentication failure in a security log. Otherwise, if the requestor is authenticated and determined to have sufficient privileges to have the RegisterContainerInstance request fulfilled, the system performing the process 800 may proceed to 806.

In 806, the system performing the process 800 may attempt to look up the container instance ID (if specified) in the relevant database, such as database 216. If the container instance ID is found and determined to already be associated with a different cluster ID, in some cases, the system performing the process 800 may, in 806, deregister the container instance from the cluster it is currently registered to and register the specified cluster. In some of these cases, this deregistration/reregistration may be performed automatically after the requestor is authenticated. In other cases, the system performing the process 800 may prompt the requestor for confirmation to deregister the container instance from the cluster it is currently registered to before the system performs the deregister/reregister operation. In still other implementations, container instances may be registered to multiple clusters simultaneously, and in such implementations, an already-registered container instance may not be deregistered from the cluster with which it is currently registered.

If the container instance has not already been registered to a cluster, has been deregistered from a cluster, or if the implementation supports container instance registration with multiple clusters, the system performing the process 800 may store the container instance ID in the database in association with the specified cluster. The system performing the process 800 may then notify the requestor that registering the container instance with the specified cluster has been successful, and, in some cases, particularly cases where a new container instance was created, the system may include the container instance ID in the response. In a subsequent DescribeContainerInstance application programming interface call, the computing resource service provider may provide the requestor, if authenticated, with information about the container instance, including available resources, tasks running within the container instance, and with which cluster or clusters the container instance is registered.

Figure 9:
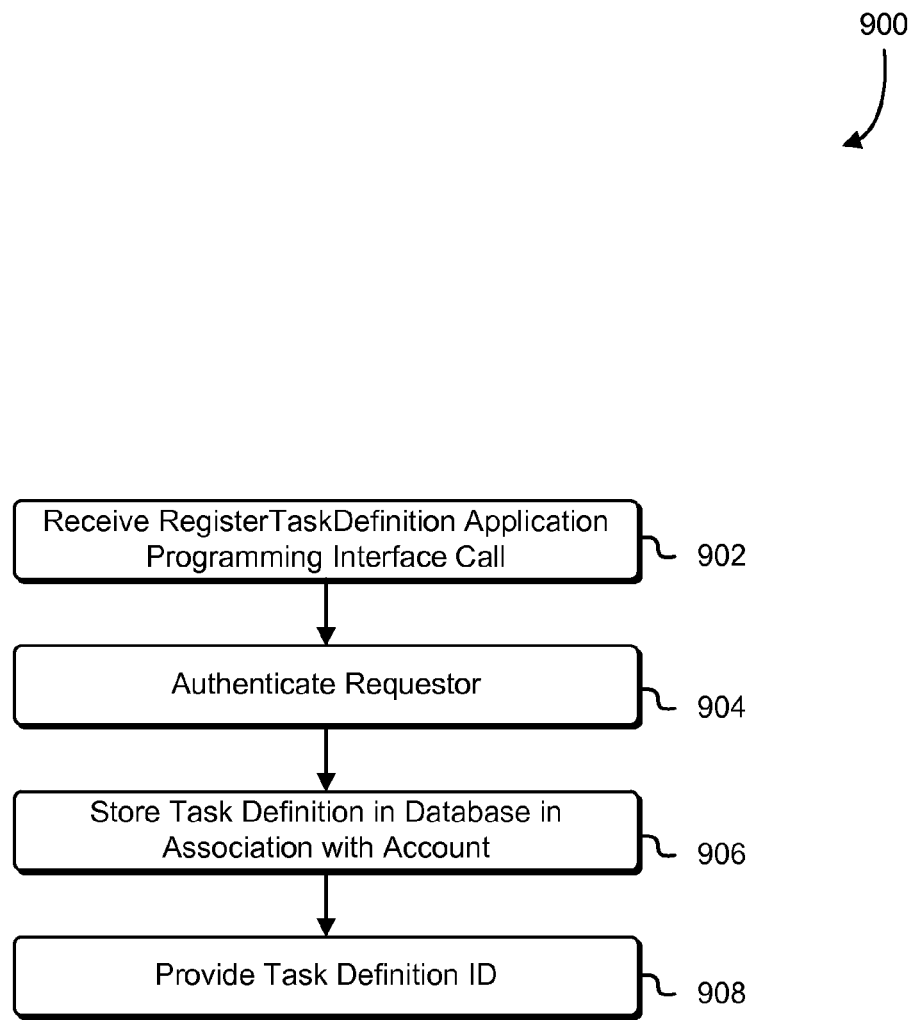
FIG. 9 is a block diagram that illustrates an example of registering a task in accordance with an embodiment.

FIG. 9 is a block diagram illustrating an example of a process 900 for registering tasks in accordance with various embodiments. The process 900 may be performed by any suitable system such as a server in a data center, multiple computing devices in a distributed system of a computing resource service provider, or any electronic client device such as the electronic client device 1602 described in conjunction with FIG. 16. The process 900 includes a series of operations wherein the system performing the process 900 receives an application programming interface call from a requestor to register a task definition. The system then authenticates the requestor, registers the task definition, and responds with a task definition ID. In some implementations, the task definition may be registered with an ID of the requestor. For example, if the requestor is a customer of a computing resource service provider, the task definition may be registered in association with an account ID of the customer. In other implementations, task definitions may be available to the public, such as through an online marketplace, and may be registered in association with the online marketplace, the purchaser, or some other entity or service.

In 902, a computing resource service provider receives an application programming interface call from a customer or other entity to register a task. Registering a task may include storing a task definition or task definition file in a database. In some implementations, the requestor need not create and upload a separate task definition, but may be able to select various options from a user interface provided by the computing resource service provider and the computing resource service provider may dynamically generate a task definition based on the selected options. In some cases, the computing resource service provider may provide a text entry interface to allow the customer to type or cut/paste a task definition through the interface. In some cases, the request to register a task may be accompanied by one or more software images corresponding to software images specified in the task definition. In some implementations, the request may specify one or more cluster IDs to associate with the task definition. In other implementations, the request may specify one or more container instance IDs to associate with the task definition. In still other implementations, the task definition may be registered independently of any specified cluster or container instance.

In 904, the computing resource service provider determines whether the requestor has sufficient privileges to have the request fulfilled. For example, the requestor may have provided an identity and proof of possession of credentials as parameters with the RegisterTaskDefinition application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 900 may not proceed further in the process 900. The system performing the process 900 may respond to a failure in authentication with an error message to the requestor and/or register the authentication failure in a security log. Otherwise, if the requestor is authenticated and determined to have sufficient privileges to have the RegisterTaskDefinition request fulfilled, the system performing the process 900 may proceed to 906.

In 906, the system performing the process 900 may store the task definition in a data store, such as the database 216 described in conjunction with FIG. 2. In some implementations, the task definition may be registered in association with a customer ID of an account of the computing resource service provider. In other implementations, the task definition may be registered to an identity of a user who obtained the task definition from a website, a computing resource service provider, or the computing resource service provider (e.g., a purchaser of a task definition from an online marketplace). In still other implementations, the task definition may be stored and linked to one or more cluster IDs and/or container instance IDs. Once stored, a task definition ID unique to the task definition may be generated by the computing resource service provider or by the database. Note as well that, in some implementations, the task definition ID may be provided with the RegisterTaskDefinition application programming interface call in order to update a task definition already stored in the database. That is, the requestor may submit an updated task definition and an existing task definition ID as parameters of the RegisterTaskDefinition application programming interface call, and the computing resource service provider may locate the task definition entry corresponding to the existing task definition ID and update the task definition corresponding to the task definition ID with the updated task definition.

Thus, in 908, the system performing the process 900 may provide that task definition ID to the requestor both as confirmation of the success of registering the task definition, and also as a way for the requestor to specify the task definition stored in the database at a later date. In some cases, one or more software images may accompany the RegisterTaskDefinition application programming interface call and these software images may be stored in the same or different data store as the task definition. In some cases, these software images may be referred to by the task definition ID, whereas in other cases the software images may receive software image IDs which may be provided to the requestor along with the task definition ID of the stored task definition.

Figure 10:
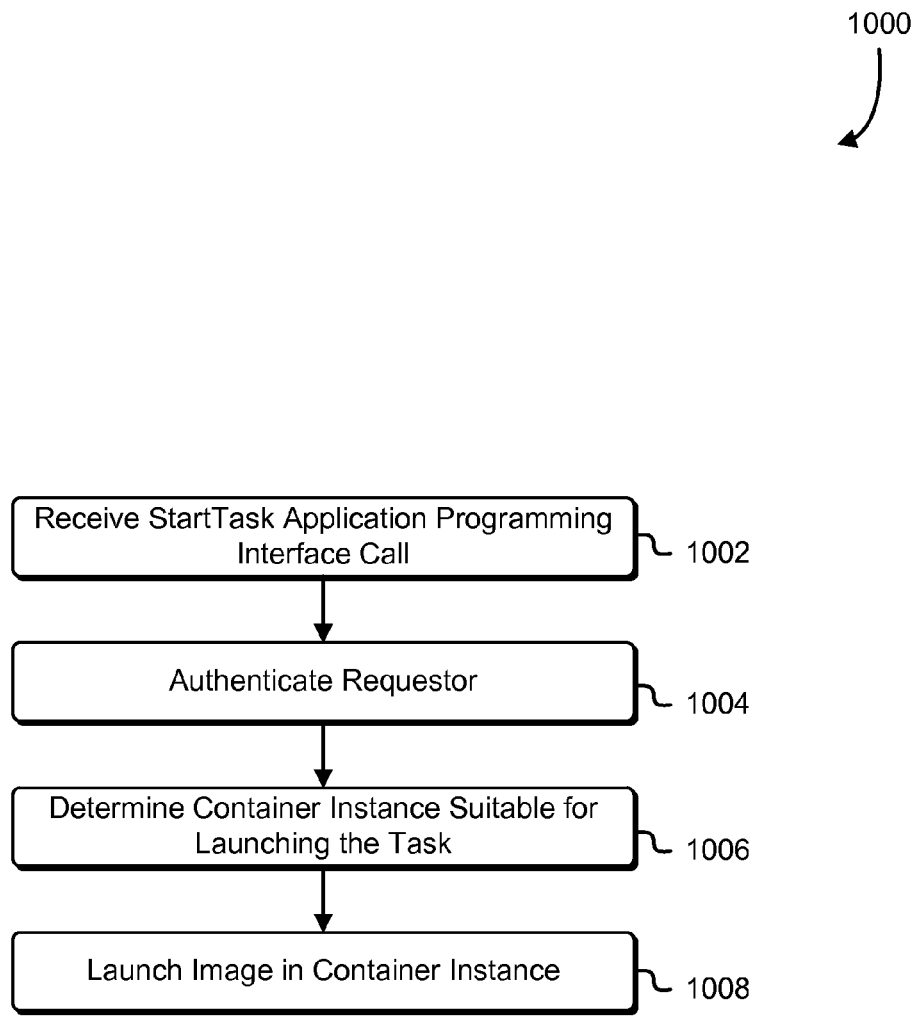
FIG. 10 is a block diagram that illustrates an example of starting a task in accordance with an embodiment.

FIG. 10 is a block diagram illustrating an example of a process 1000 for starting a task in accordance with various embodiments. The process 1000 may be performed by any suitable system such as a server in a data center, multiple computing devices in a distributed system of a computing resource service provider, or any electronic client device such as the electronic client device 1602 described in conjunction with FIG. 16. The process 1000 includes a series of operations wherein a request is received to start a task, the requestor is authenticated, and, if authenticated, the proper place in which to launch the task is determined and the task is launched.

In 1002, a computing resource service provider receives an application programming interface call to start a task. In some cases, this application programming interface call may be received through the front-end service from a customer or other entity external to the container service. In other cases, this application programming interface call may be made by a container agent in response to a communication from a scheduler to start a task. The StartTask application programming interface may be used to start running a software container from, for example, an image of a software container or from one or more executable application files. The StartTask application programming interface call may include a parameter for one or more task definition IDs for task definitions stored in a data store, such as the database 216. In some cases, the task definition itself, rather than a task definition ID, may be passed as a parameter to the StartTask application programming interface call. In other cases, parameters indicating locations (e.g., uniform resource locator, network resource locator, file path, etc.) of one or more task definition files may be passed as parameters to the StartTask application programming interface. In still other cases, the container service may be configured to start tasks without a separate program definition; for example, the StartTask application programming interface may have default parameters, and any information for starting the task that is required from the requestor or which deviates from the defaults may be passed as parameters to the StartTask application programming interface call.

The StartTask application programming interface may also accept as a parameter, one or more image IDs for software images representing the base container images. In some cases, a parameter indicating a location of an image file may be passed instead of an image file. In still other cases, the task definition may contain information for locating the container software to start running as the task. The requestor may also specify one or more cluster IDs as parameters to the StartTask application programming interface call to indicate into which clusters the task or tasks should be started. Similarly, the requestor may specify one or more container instance IDs as parameters to the StartTask application programming interface call to indicate into which container instances the task or tasks should be started. The IDs of clusters may be obtained through a ListClusters application programming interface call. The IDs of registered container instances may be obtained from a DescribeCluster application programming interface call.

In 1004, the computing resource service provider determines whether the requestor has sufficient privileges to have the request fulfilled. For example, the requestor may have provided an identity and proof of possession of credentials as parameters with the StartTask application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 1000 may not proceed further in the process 1000. The system performing the process 1000 may respond to a failure in authentication with an error message to the requestor and/or register the authentication failure in a security log. Otherwise, if the requestor is authenticated and determined to have sufficient privileges to have the StartTask request fulfilled, the system performing the process 1000 may proceed to 1006.

In 1006, the system performing the process 1000 may determine the container instance into which to start the task. In some embodiments, a scheduler of the container service, such as the scheduler 208 of FIG. 2, may determine into which container instance of specified clusters and/or list of container instances the task or tasks should be started according to a placement scheme. The placement scheme may be any of a variety of placement schemes, including round-robin, pseudo-random stochastic placement scheme, or a placement scheme that takes container states (e.g., current amount of available resources, etc.) into account. In some implementations, the customer of the account may have installed a scheduler application within a virtual machine instance. In such implementations, the StartTask application programming interface call may receive as a parameter an ID or resource locator indicating the location of the installed scheduler and the process 1000 may further include the system performing the process 1000 communicating with the installed scheduler to determine into which container instance the task or tasks should be launched. In some cases, the specified task may already be started. In such cases, the system performing the process 1000 may stop the running task and restart the task. In some of these cases, the system performing the process 1000 may notify the requestor that the task is already started and may request confirmation whether to stop the running task and restart the task.

In some situations, the system performing the process 1000 may determine that insufficient resources are available in the cluster or list of container instance to launch the task or tasks. For example, the task definition file may have specified more memory to be allocated to the software containers than is currently available in the container instances of a specified cluster. In some of these cases, the system performing the process 1000 may wait for a predetermined period of time (e.g., 10 milliseconds) and try again to start the tasks, repeating until the system is able to start the tasks or until a threshold number of attempts have occurred.

If the system performing the process 1000 is unable to start the tasks, the system may notify the requestor that the tasks were unable to be started due to the particular problem encountered. In some implementations, if insufficient resources are available to start the task, the container service may interact with an auto-scaling service to generate additional resources to support starting the task. For example, the system performing the process 1000 may instantiate and register one or more new container instances with the cluster and start the task or tasks in the new container instances. As another example, the system performing the process 1000 may take a snapshot of a container instance, restart the container instance with upgraded resources (e.g., processing capability and memory), and restore the container instance from the snapshot.

In 1008, the system performing the process 1000 may launch the container image or specified application into the determined container instance. As noted, launching the container image or specified application into the container instance may include generating one or more task IDs for the tasks, storing the task IDs in a data store such as database 216 of FIG. 2 in association with the determined container instance ID, specifying a separate namespace for a container, allocating specified resources to the container, and restoring the specified container image and/or specified application into the container namespace. This may be performed for each container defined in a task definition. The task definition may also indicate linkages between containers; for example, a container configured to serve as a web service may be linked to a container configured to serve as a database, and the two containers may be configured to communicate with each other when they are launched. Likewise, in some implementations, containers may share specified resources of other services of the computing resource service provider. For example, the task definition file may specify that two containers share a particular block-level data storage volume.

Once launched, the system performing the process may notify the requestor that the task or tasks have been successfully launched. In some cases, this may be a matter of changing an icon of a monitoring interface to indicate that a task has been started and the task is now running within a particular cluster or instance. In other cases, this may be a matter of logging the event. In still other cases, the requestor may be notified by receiving a valid task ID from the system that corresponds to the running task. The list of running tasks may be obtained from a ListTasks application programming interface call. Data about the task, such as health of the container, age of the container, and resource usage by the container, may be obtained by using a DescribeTask application programming interface and specifying a task ID.

Figure 11:
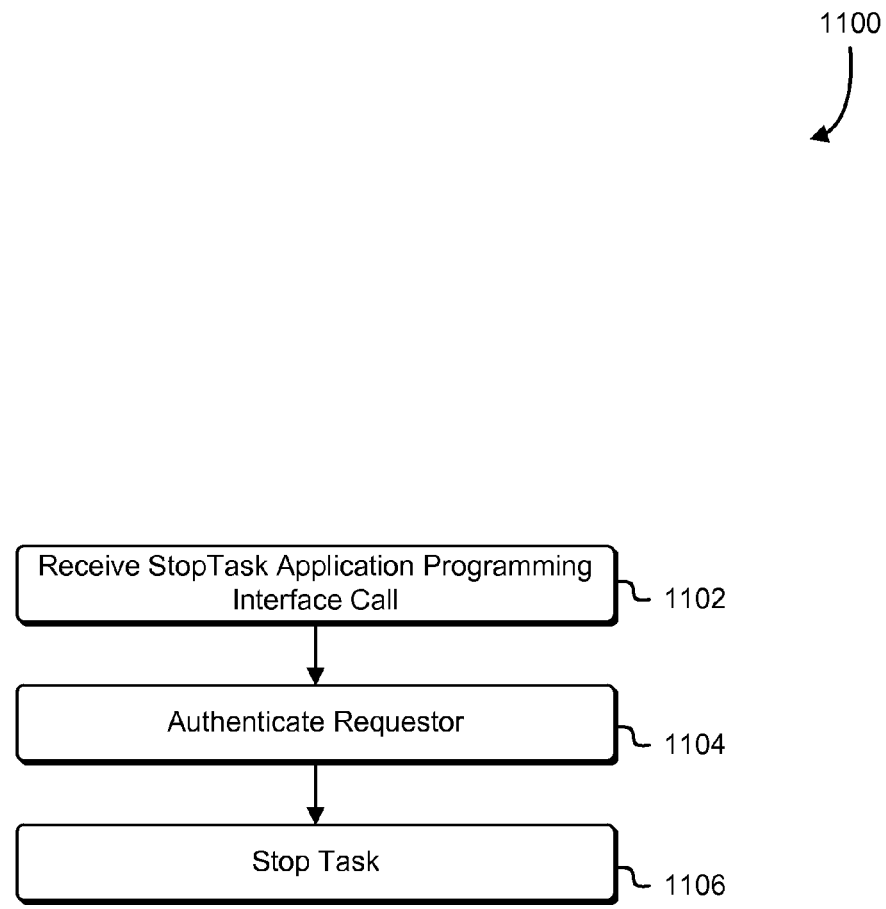
FIG. 11 is a block diagram that illustrates an example of stopping a task in accordance with an embodiment.

FIG. 11 is a block diagram illustrating an example of a process 1100 for stopping a task in accordance with various embodiments. The process 1100 may be performed by any suitable system such as a server in a data center, multiple computing devices in a distributed system of a computing resource service provider, or any electronic client device such as the electronic client device 1602 described in conjunction with FIG. 16. The process 1100 includes a series of operations wherein a stop task request is received that specifies a task to stop, the requestor is authenticated, and the specified task is stopped thereby freeing resources allocated to the task.

In 1102, a computing resource service provider receives an application programming interface call to stop a running task. In some cases, the application programming interface call may be received from a customer or other entity external to the container service to the front end service. In other cases, the container agent may make the application programming interface call in response to a communication from a scheduler to stop a task. The StopTask may receive, as a parameter, one or more task IDs of running tasks. In 1104, the computing resource service provider determines whether the requestor has sufficient privileges to have the request fulfilled. For example, the requestor may have provided an identity and proof of possession of credentials as parameters with the StopTask application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 1100 may not proceed further in the process 1100. The system performing the process 1100 may respond to a failure in authentication with an error message to the requestor and/or register the authentication failure in a security log. Otherwise, if the requestor is authenticated and determined to have sufficient privileges to have the StopTask request fulfilled, the system performing the process 1100 may proceed to 1106.

In 1106, the specified running task or tasks may be stopped and the resources previously allocated to the task or tasks may be freed/garbage collected and added to the available resources of the host container instance. In some cases, the task ID may be disabled, archived, or removed from the data store. In other cases, a status of the task may be updated to "Stopped" and this change in status may be reflected in any interface for viewing the status of running tasks. The requestor may also be notified that the task associated with the task ID has been successfully stopped.

Figure 12:
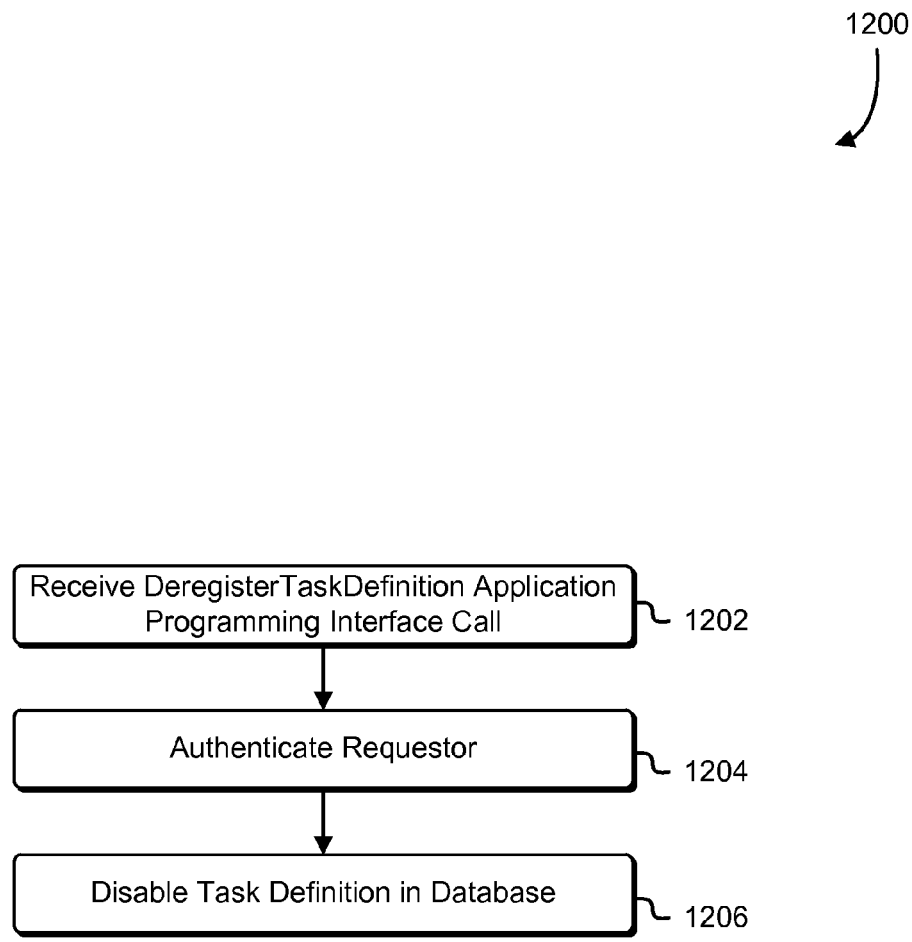
FIG. 12 is a block diagram that illustrates an example of deregistering a task in accordance with an embodiment.

FIG. 12 is a block diagram illustrating an example of a process 1200 for deregistering a container instance in accordance with various embodiments. The process 1200 may be performed by any suitable system such as a server in a data center, multiple computing devices in a distributed system of a computing resource service provider, or any electronic client device such as the electronic client device 1602 described in conjunction with FIG. 16. The process 1200 includes a series of operations wherein a request is received to deregister a task definition, the requestor is authenticated, and, if the requestor has sufficient privileges, the task definition may be deregistered.

In 1202, a computing resource service provider receives an application programming interface call to deregister a task. In some cases, this request may be received from a customer or other entity to the container service. Deregistering a task may include disabling, archiving, or removing a task from a data store that has been registered according to the process 900 for registering a task. Thus, the task definition ID generated in the process 900 may be provided with the DeregisterTaskDefinition application programming interface call to identify which task is to be deregistered.

In 1204, the computing resource service provider determines whether the requestor has sufficient privileges to have the request fulfilled. For example, the requestor may have provided an identity and proof of possession of credentials as parameters with the DeregisterTaskDefinition application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 1200 may not proceed further in the process 1200. The system performing the process 1200 may respond to a failure in authentication with an error message to the requestor and/or register the authentication failure in a security log. Otherwise, if the requestor is authenticated and determined to have sufficient privileges to have the DeregisterTaskDefinition request fulfilled, the system performing the process 1200 may proceed to 1206.

In 1206, the system performing the process 1200 may disable, archive, or remove the task definition from the data store where the task definition was stored in 906. Any data entries indicating a relationship between the task definition and a cluster, container instance, software image, or other container may be disabled, archived, or removed as well. In some cases, if the task or tasks associated with the task definition are running, the tasks may be stopped in accordance with the process 1100 for stopping tasks. Once the task is deregistered, the requestor may be notified of the successful deregistration of the task.

Figure 13:
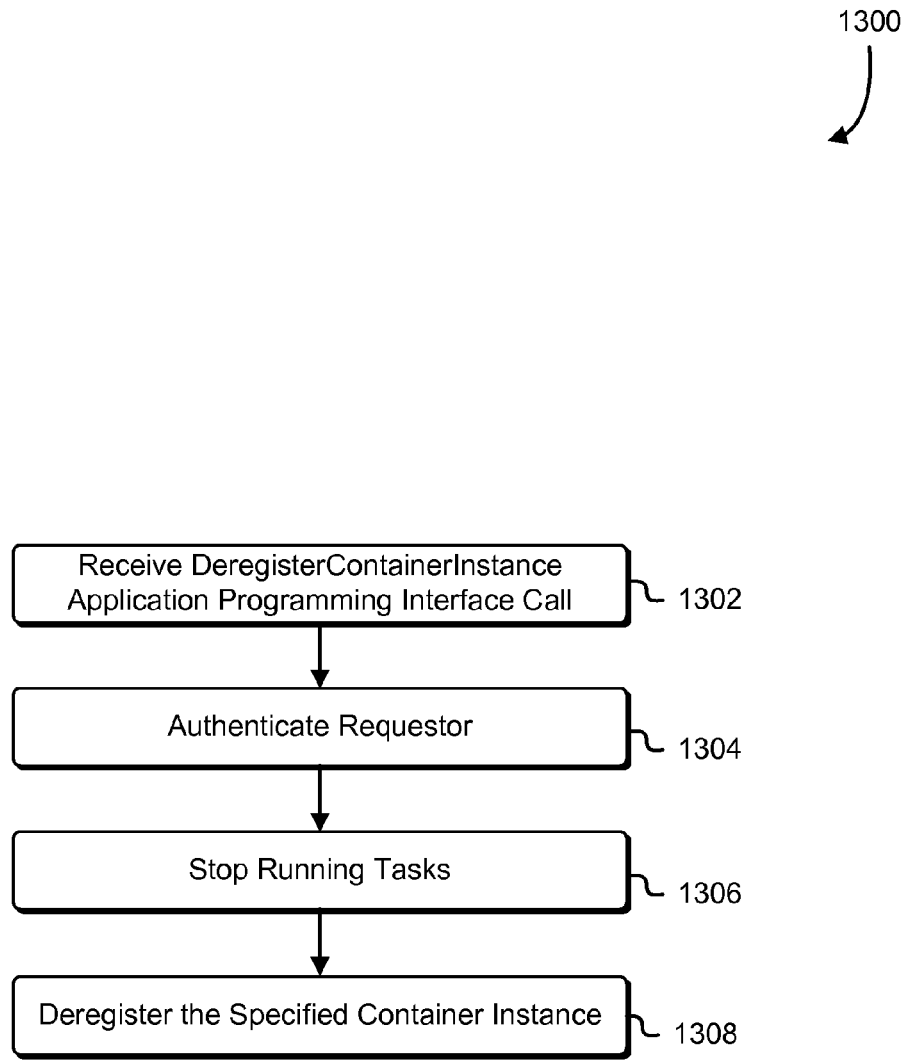
FIG. 13 is a block diagram that illustrates an example of deregistering a container in accordance with an embodiment.

FIG. 13 is a block diagram illustrating an example of a process 1300 for deregistering a container instance in accordance with various embodiments. The process 1300 may be performed by any suitable system such as a server in a data center, multiple computing devices in a distributed system of a computing resource service provider, or any electronic client device such as the electronic client device 1602 described in conjunction with FIG. 16. The process 1300 includes a series of operations wherein a request is received to deregister a registered container instance from a cluster, the requestor is authenticated, and the container instance is deregistered from the cluster.

In 1302, a computing resource service provider receives an application programming interface call from a customer or other entity to deregister a container instance. Deregistering a container instance may include disassociating a container instance registered in accordance with the process 800 for registering a container instance from a specified cluster. This association may be found in a database, such as the database 216 of FIG. 2, as a relationship between an ID of the registered container instance passed as parameters of the DeregisterContainerInstance application programming interface call and a cluster ID. In cases, this request may be received from the front end service and communicated with the container agent, which deregisters its respective container instance. In other cases, this request may be made from a container agent to the front end service. For example, when a container instance is to be deprovisioned, removed from a cluster, and transferred to a different cluster, the container agent may automatically seek to deregister the container instance from the cluster to which it is currently registered. In some of these cases, the requestor may specify an instance ID of the registered container, as may be revealed by a DescribeCluster application programming interface call, and the system performing the process 1300 may deregister the specified container instance from all clusters to which it is registered. In some cases, if the container instance is registered to multiple clusters, the system performing the process 1300 may prompt the requestor for confirmation of which cluster or clusters from which the container instance should be deregistered. In other cases both an instance ID and a cluster ID may be passed as parameters to the DeregisterContainerInstance application programming interface call, and the container instance may be deregistered, assuming the requestor has sufficient privileges as determined in 1304, from the specified cluster.

In 1304, the computing resource service provider determines whether the requestor has sufficient privileges to have the request fulfilled. For example, the requestor may have provided an identity and proof of possession of credentials as parameters with the DeregisterContainerInstance application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 1300 may not proceed further in the process 1300. The system performing the process 1300 may respond to a failure in authentication with an error message to the requestor and/or register the authentication failure in a security log. Otherwise, if the requestor is authenticated and determined to have sufficient privileges to have the RegisterContainerInstance request fulfilled, the system performing the process 1300 may proceed to 1306.

In 1306, the system performing the process 1300 may look up the specified instance ID in the data store where the container instance was registered. Note that tasks running within the specified container instance may be stopped in accordance with the process 1100 for stopping tasks before the container instance is deregistered. In some cases, if tasks are running in the specified container instance, the system performing the process 1300 may request confirmation from the requestor to stop the running tasks before the system will deregister the container instance. As noted, in some implementations, a container instance may be registered to multiple clusters and the requestor may specify that the container instance only be deregistered from a subset of the clusters. In such implementations, if tasks associated with the specified subset of the clusters are running within the container instance and confirmed by the requestor to be stopped, only the tasks associated with the specified subset of the clusters may be stopped and the remainder of running tasks may left alone.

In 1308, after the instance ID has been found in the database and relevant tasks have been stopped, the instance ID may be disabled, archived, or removed from the data store. In some cases, a status of the instance may be updated to "Deregistered" and this change in status may be reflected in any interface for viewing the status of the cluster. If the container instance is registered to multiple clusters, the specified container instance may be disassociated from only the specified subset of the clusters and the container instance may remain registered to the remainder of the clusters. Once deregistered, the requestor may also be notified that the container instance associated with the instance has been successfully deregistered in the cluster or clusters from which it was deregistered.

Container instances that are not registered to any clusters may be deprovisioned, and any resources allocated to the container instances may be freed, in some implementations of the present disclosure. Alternatively, the container instances may be added to a queue of instances available to be registered with a cluster. In this manner, when a container instance is needed for registration to a cluster in accordance with the process 800 for registering container instances, a container instance may be selected from the available container instances without the overhead of provisioning a new container instance for registration.

Figure 14:
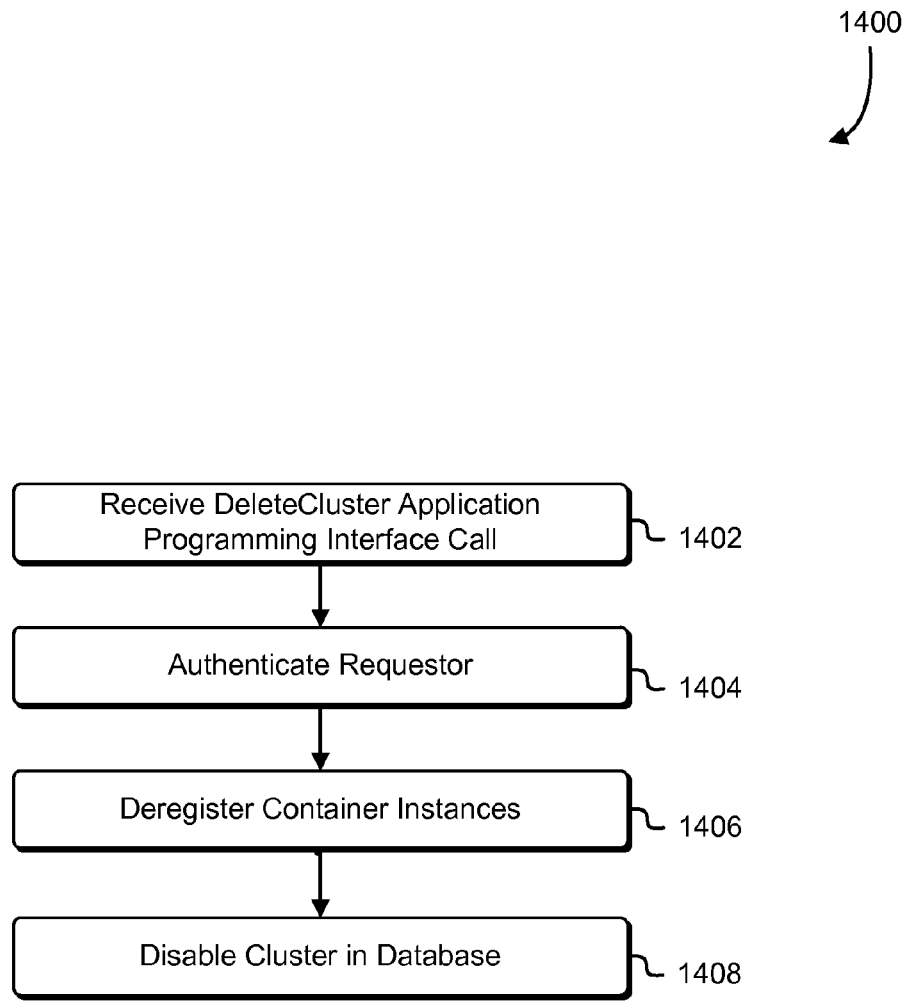
FIG. 14 is a block diagram that illustrates an example of deleting a cluster in accordance with an embodiment.

FIG. 14 is a block diagram illustrating an example of a process 1400 for deleting a cluster in accordance with various embodiments. The process 1400 may be performed by any suitable system such as a server in a data center, multiple computing devices in a distributed system of a computing resource service provider, or any electronic client device such as the electronic client device 1602 described in conjunction with FIG. 16. The process 1400 includes a series of operations wherein a request is received to delete a cluster, the requestor is authenticated, any container instances in the cluster are deregistered, and the cluster is deleted or otherwise disabled.

In 1402, a computing resource service provider receives an application programming interface call from a customer or other entity to delete a cluster. The cluster to be deleted may be a default cluster provided by the computing resource service provider or may be a cluster created in accordance with the process 700 for creating a cluster. The DeleteCluster application programming interface may receive, as a parameter, a cluster ID for the cluster to be deleted. The cluster ID and cluster metadata may consequently be stored in a data store, such as the database 216 of FIG. 2. This cluster ID may have been provided to the requestor when the cluster was created, or may be determined from a ListClusters application programming interface call.

In 1404, the computing resource service provider determines whether the requestor has sufficient privileges to have the request fulfilled. For example, the requestor may have provided an identity and proof of possession of credentials as parameters with the DeleteCluster application programming interface call. For example, the requestor may supply, as proof of possession of credentials corresponding to the identity, information sufficient to prove access to the credentials, such as a password, a cryptographic hash/digest of the password, cryptographic digital signature generated by a signing encryption key, or other secret key verifiable by the computing resource service provider for authorizing the identity of the requestor. The computing resource service provider may provide that identity and proof to an authentication service, such as the authentication system 1518 of FIG. 15, which may then verify the identity and proof of credentials of the requestor. Once the identity of the requestor is verified, the computing resource service provider or authentication service may determine whether a security policy and/or role associated with the identity grants sufficient privileges to allow the request to be fulfilled.

If the computing resource service provider was unable to determine the identity (e.g., not found in a security database), proof of credentials were insufficient to prove the identity (e.g., wrong password), or identity of the requestor could otherwise not be confirmed, the system performing the process 1400 may not proceed further in the process 1400. The system performing the process 1400 may respond to a failure in authentication with an error message to the requestor and/or register the authentication failure in a security log. Otherwise, if the requestor is authenticated and determined to have sufficient privileges to have the DeleteCluster request fulfilled, the system performing the process 1400 may proceed to 1406.

In 1406, if any container instances are registered to the specified cluster, each of the container instances may be deregistered from the cluster in accordance with the process 1300 for deregistering container instances. In 1408, the entry or entries for the cluster associated with the specified cluster ID may be located in the data store and disabled, archived, or removed from the data store. If the cluster is disabled or archived, the metadata about the cluster may be preserved and the cluster may be reactivated by an entity with authority to do so. The requestor may then be notified that the cluster has been successfully deleted and that container instances can no longer be registered to the cluster ID. For example, an interface displaying the statutes of clusters may be updated to reflect "Deleted" for the specified cluster and the cluster may no longer be reflected in ListClusters application programming interface call response.

FIG. 15 shows an example of a customer connected to a computing resource service provider in accordance with at least one embodiment. The computing resource service provider 1502 may provide a variety of services to the customer 1504 and the customer 1504 may communicate with the computing resource service provider 1502 via an interface 1526, which may be a web services interface or any other type of customer interface. While FIG. 15 shows one interface 1526 for the services of the computing resource service provider 1502, each service may have its own interface and, generally, subsets of the services may have corresponding interfaces in addition to or as an alternative to the interface 1526. The customer 1504 may be an organization that may utilize one or more of the services provided by the computing resource service provider 1502 to maintain and deliver information to its employees, which may be located in various geographical locations. Additionally, the customer 1504 may be an individual that utilizes the services of the computing resource service provider 1502 to deliver content to a working group located remotely. As shown in FIG. 15, the customer 1504 may communicate with the computing resource service provider 1502 through a network 1506, whereby the network 1506 may be a communication network, such as the Internet, an intranet or an Internet service provider (ISP) network. Some communications from the customer 1504 to the computing resource service provider 1502 may cause the computing resource service provider 1502 to operate in accordance with one or more embodiments described or a variation thereof.

The computing resource service provider 1502 may provide various computing resource services to its customers. The services provided by the computing resource service provider 1502, in this example, include a virtual computer system service 1508, a block-level data storage service 1510, a cryptography service 1512, an on-demand data storage service 1514, a notification service 1516, an authentication system 1518, a policy management service 1520, a container service 1522 and one or more other services 1524. It is noted that not all embodiments described include the services 1508-24 described with reference to FIG. 15 and additional services may be provided in addition to or as an alternative to services explicitly described. As described, each of the services 1508-24 may include one or more web service interfaces that enable the customer 1504 to submit appropriately configured API calls to the various services through web service requests. In addition, each of the services may include one or more service interfaces that enable the services to access each other (e.g., to enable a virtual computer system of the virtual computer system service 1508 to store data in or retrieve data from the on-demand data storage service 1514 and/or to access one or more block-level data storage devices provided by the block-level data storage service 1510).

The virtual computer system service 1508 may be a collection of computing resources configured to instantiate virtual machine instances on behalf of the customer 1504. The customer 1504 may interact with the virtual computer system service 1508 (via appropriately configured and authenticated API calls) to provision and operate virtual computer systems that are instantiated on physical computing devices hosted and operated by the computing resource service provider 1502. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 1508 is shown in FIG. 15, any other computer system or computer system service may be utilized in the computing resource service provider 1502, such as a computer system or computer system service that does not employ virtualization or instantiation and instead provisions computing resources on dedicated or shared computers/servers and/or other physical devices.

The block-level data storage service 1510 may comprise one or more computing resources that collectively operate to store data for a customer 1504 using block-level storage devices (and/or virtualizations thereof). The block-level storage devices of the block-level data storage service 1510 may, for instance, be operationally attached to virtual computer systems provided by the virtual computer system service 1508 to serve as logical units (e.g., virtual drives) for the computer systems. A block-level storage device may enable the persistent storage of data used/generated by a corresponding virtual computer system where the virtual computer system service 1508 may only provide ephemeral data storage.

The computing resource service provider 1502 also includes a cryptography service 1512. The cryptography service 1512 may utilize one or more storage services of the computing resource service provider 1502 to store keys of the customers in encrypted form, whereby the keys may be usable to decrypt customer 1504 keys accessible only to particular devices of the cryptography service 1512.

The computing resource service provider 1502 further includes an on-demand data storage service 1514. The on-demand data storage service 1514 may be a collection of computing resources configured to synchronously process requests to store and/or access data. The on-demand data storage service 1514 may operate using computing resources (e.g., databases) that enable the on-demand data storage service 1514 to locate and retrieve data quickly, to allow data to be provided in responses to requests for the data. For example, the on-demand data storage service 1514 may maintain stored data in a manner such that, when a request for a data object is retrieved, the data object can be provided (or streaming of the data object can be initiated) in a response to the request. As noted, data stored in the on-demand data storage service 1514 may be organized into data objects. The data objects may have arbitrary sizes except, perhaps, for certain constraints on size. Thus, the on-demand data storage service 1514 may store numerous data objects of varying sizes. The on-demand data storage service 1514 may operate as a key value store that associates data objects with identifiers of the data objects that may be used by the customer 1504 to retrieve or perform other operations in connection with the data objects stored by the on-demand data storage service 1514.

In the environment illustrated in FIG. 15, a notification service 1516 is included. The notification service 1516 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1516 may provide notifications to clients using a "push" mechanism without the need to check periodically or "poll" for new information and updates. The notification service 1516 may further be used for various purposes such as monitoring applications executing in the virtual computer system service 1508, workflow systems, time-sensitive information updates, mobile applications, and many others.

As illustrated in FIG. 15, the computing resource service provider 1502, in various embodiments, includes an authentication system 1518 and a policy management service 1520. The authentication system 1518, in an embodiment, is a computer system (i.e., collection of computing resources) configured to perform operations involved in authentication of users of the customer. For instance, one of the services 1508-1516 and 1520-24 may provide information from a user to the authentication system 1518 to receive information in return that indicates whether the user requests are authentic.

The policy management service 1520, in an embodiment, is a computer system configured to manage policies on behalf of customers (such as customer 1504) of the computing resource service provider 1502. The policy management service 1520 may include an interface that enables customers to submit requests related to the management of policy. Such requests, for instance, may be requests to add, delete, change, or otherwise modify policy for a customer or for other administrative actions, such as providing an inventory of existing policies and the like.

The computing resource service provider 1502, in various embodiments, is also equipped with a container service 1522. The container service 1522 is configured to create and manage software containers and container instances for the customers 1504 of the computing resource service provider in the manner described for the container service 200 of FIG. 2. The container service 1522 may be configured to use other resources of the computing resource service provider 1502, such as the block-level data storage service 1510. For example, the container service 1522 may allow tasks running within container instances to share one or more specified block-level data storage volumes.

The computing resource service provider 1502 additionally maintains one or more other services 1524 based at least in part on the needs of its customers 1504. For instance, the computing resource service provider 1502 may maintain a database service for its customers 1504. A database service may be a collection of computing resources that collectively operate to run one or more databases for one or more customers 1504. The customer 1504 may operate and manage a database from the database service by utilizing appropriately configured API calls. This, in turn, may allow a customer 1504 to maintain and potentially scale the operations in the database. Other services include, but are not limited to, object-level archival data storage services, and services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 16:
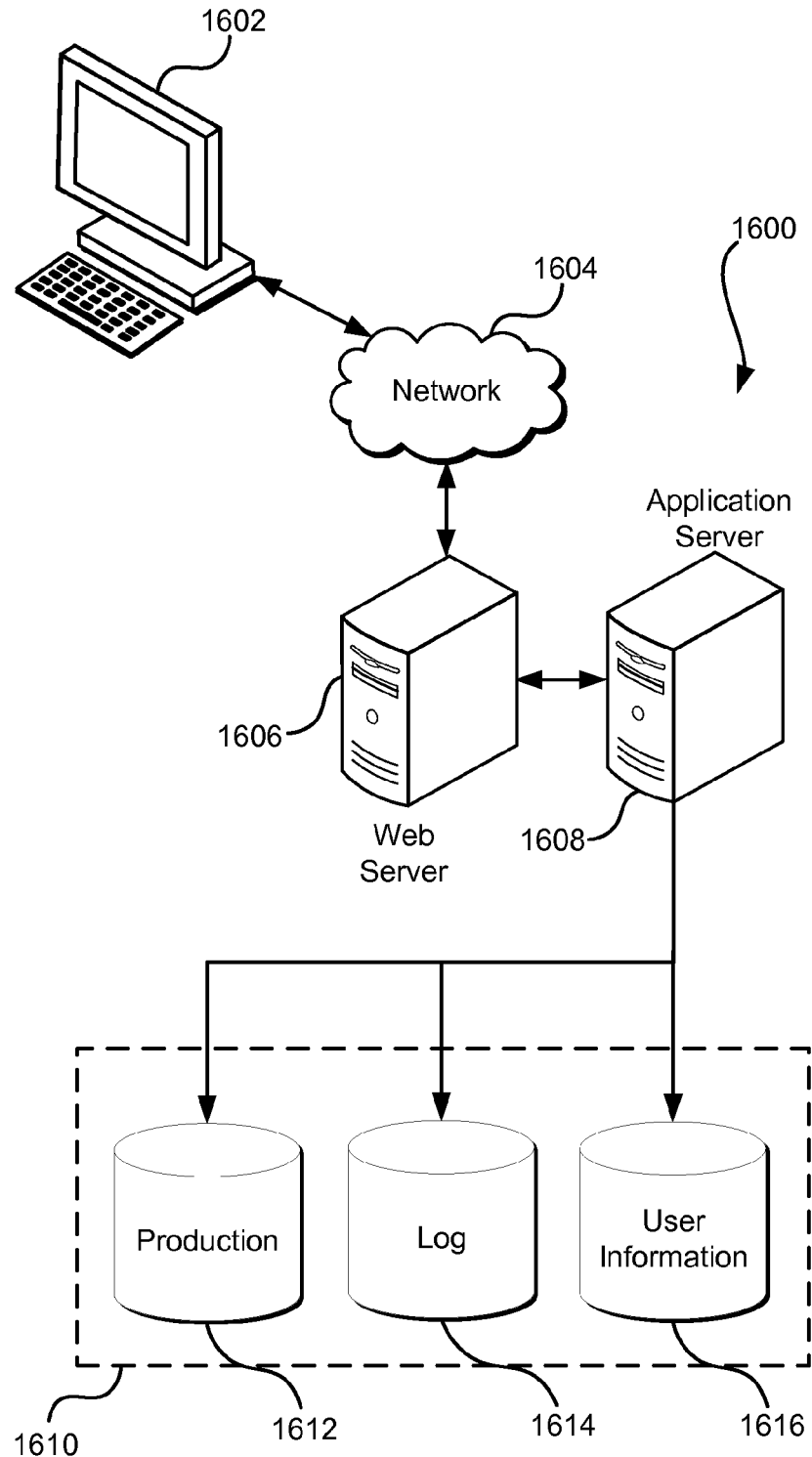
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes an application server 1608 and a data store 1610. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the electronic client device 1602 and the application server 1608, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the example environment 1600 in FIG. 16 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    under the control of one or more computer systems configured with executable instructions,
    creating a cluster and a cluster identifier that identifies the cluster, wherein the cluster represents a set of container instances associated with a customer of a computing resource service provider that are registered to the cluster and configured to run one or more software containers;
    obtaining an image of a software container configured to execute within a computer system instance, wherein the software container comprises data and one or more processes which, when executed in the computer system instance, are isolated from other processes running within the computer system instance, and wherein the image is an entire copy of a particular state of the software container at a time the image was generated;
    receiving a request to launch a set of images, including any image of the software container, in accordance with a task definition, wherein the task definition identifies a set of software containers, including the software container, that are assigned to start as a group and specifies an allocation of resources to the set of software containers, wherein the request specifies the cluster identifier of the cluster; and
    in response to the request to launch the one or more images,
    determining a subset of the set of container instances represented by the cluster specified by the cluster identifier in which to launch the set of software containers, wherein one or more container instances are determined according to a placement scheme; and
    launching the set of images to yield running software containers within the subset of the set of container instances so that the running software containers are allocated resources in accordance with the allocation of resources specified in the task definition.

2. The computer-implemented method of claim 1, wherein the subset of the set of container instances is determined by a multitenant scheduler service configured to determine the subset of the set of container instances based at least in part on the placement scheme and the task definition.

3. The computer-implemented method of claim 1, wherein the set of images are caused to be launched by individual container agents running within the subset of the set of container instances, wherein the individual container agents are software applications each configured to run in respective container instances and act as intermediaries between the running software containers and entities external to the respective container instances.

4. The computer-implemented method of claim 1, wherein the method further comprises providing metrics and log information about the running software containers to a telemetry service, wherein the telemetry service is configurable to aggregate the metrics and log information and provide the aggregated metrics and log information to a resource monitoring service.

5. A system, comprising:
    one or more processors;
    memory including instructions that, when executed by the one or more processors, cause the system to implement at least:

a backend service that:
  receives placement requests for a set of container instances, wherein the set of container instances host a corresponding set of container agents,
  receives a task definition that specifies, for the set of containers, locations of software images for individual containers of the set of containers and resources to be allocated to the individual containers of the set of containers,
  ensures that the resources specified by the task definition are available within the set of container instances, and
  receives information from the set of container agents about states of a set of running containers in the set of container instances,
  provides the information to a scheduler; and
the scheduler that, based at least in part on a placement scheme, the task definition, and the information provided by the backend service:
  determines a subset of the set of container instances registered to a cluster within which to place individual containers of the set of containers, the subset determined based at least in part on the resources to be allocated to the individual containers of the set of containers and amounts of available resources within individual container instances of the set of container instances registered to the cluster,
  notifies the container agent to allocate resources for the individual containers within the subset according to the resources to be allocated to the individual containers specified by the task definition, and
  notifies the container agent to launch, within the subset and from locations of the software images specified by the task definition, the set of containers as the set of running containers.

6. The system of claim 5, wherein the subset of the set of container instances is determined by a multitenant scheduler service of a computing resource service provider.

7. The system of claim 5, wherein the subset of the set of container instances is determined by a scheduler application installed by a customer of a computing resource service provider.

8. The system of claim 5, wherein the instructions further include instructions that, when executed by the one or more processors, cause the system to implement a telemetry agent that collects data for a telemetry service about processes running within the set of running containers, wherein the telemetry service aggregates the data and provides the aggregated data to a resource monitoring service.

9. The system of claim 5, wherein the instructions further include instructions that, when executed by the one or more processors, cause the system to implement the set of container agents running within the set of container instances that:
  register the set of container instances with the cluster,
  allocate the resources for the set of container instances in response to a notification from the scheduler to allocate the resources,
  launch the set of containers as the set of running containers in response to a notification from the scheduler to launch the set of containers,
  monitor the states of the set of running containers in the set of container instances, and
  provide the information about the states to the backend service.

10. The system of claim 9, wherein the set of container agents are further configured to provide one or more of periodic signals to indicate normal operation of the individual containers, statuses of the individual containers, and occurrences of errors by the individual containers.

11. The system of claim 9, wherein the instructions that implement the set of container agents further include instructions that, when executed by the one or more processors, cause the system to implement the set of container agents to:
  stop the set of running containers from running;
  deregister the set of container instances from the cluster; and
  delete the cluster.

12. A non-transitory computer-readable storage medium having stored thereon executable instructions that, when executed by one or more processors of a computer system, cause the computer system to at least:
  obtain a software image of a software container of a set of software containers configured to execute within a computer system instance;
  receive a task definition specifying, for the set of containers, locations of the software images for individual containers of the set of containers and resources to be allocated to individual containers of the set of containers;
  receive a request to launch the software image in accordance with the task definition;
  determine a set of container instances in which to launch the software image in accordance with the task definition, wherein the set of container instances are determined according to a placement scheme, the placement scheme depending at least in part on the resources to be allocated to the individual containers of the set of containers and amounts of available resources within individual container instances of the set of container instances; and
  launch the software image as one or more running software containers in the set of container instances in accordance with the task definition.

13. The non-transitory computer-readable storage medium of claim 12, wherein the placement scheme is one of a round robin placement scheme or a stochastically assigned placement scheme.

14. The non-transitory computer-readable storage medium of claim 12, wherein the instructions further comprise instructions that, when executed by the one or more processors, cause the computer system to, in response to an application programming interface call, create a cluster for representing a set of computer system instances wherein the computer system instance is a member of the set.

15. The non-transitory computer-readable storage medium of claim 12, wherein the instructions that cause the computer system to determine the set of container instances further include instructions that, when executed by the one or more processors, cause the computer system to determine the set of container instances based at least in part on one or security groups or security roles assigned to the software image.

16. The non-transitory computer-readable storage medium of claim 12, wherein the instructions further comprise instructions that, when executed by the one or more processors, cause the computer system to, in response to an application programming interface call, register the computer system instance with a cluster representing a set of computer system instances.

17. The non-transitory computer-readable storage medium of claim 12, wherein the instructions further comprise instructions that, when executed by the one or more processors, cause the computer system to, in response to an application programming interface call, register the task definition with an account of a customer of a computing resource service provider.

18. The non-transitory computer-readable storage medium of claim 12, wherein the request to launch the software image is a request received through an application programming interface call to launch the software image in accordance with the task definition.

19. The non-transitory computer-readable storage medium of claim 12, wherein the set of container instances is a subset of container instances registered to a cluster and the instructions further comprise instructions that, when executed by the one or more processors, cause the computer system to, in response to an application programming interface call, return information about what software images are running in the container instances registered to the cluster and what resources are available in the container instances registered to the cluster.

\* \* \* \* \*